United States Patent
Gazdzinski

(10) Patent No.: US 7,277,636 B1
(45) Date of Patent: Oct. 2, 2007

(54) OPTICAL COMMUNICATION APPARATUS AND METHODS USING PULSES HAVING MODIFIED PROPAGATION SPEEDS

(76) Inventor: Robert F. Gazdzinski, 11027 Elderwood La., San Diego, CA (US) 92131

( * ) Notice: Subject to any disclaimer, the term of this patent is extended or adjusted under 35 U.S.C. 154(b) by 761 days.

(21) Appl. No.: 10/059,580

(22) Filed: Jan. 28, 2002

Related U.S. Application Data

(60) Provisional application No. 60/264,477, filed on Jan. 26, 2001.

(51) Int. Cl.
*H04J 14/00* (2006.01)
*H04J 14/08* (2006.01)

(52) U.S. Cl. .......................... 398/53; 398/102
(58) Field of Classification Search .............. 398/12, 398/19, 45, 92, 182, 200, 53, 102
See application file for complete search history.

(56) References Cited

U.S. PATENT DOCUMENTS

| | | | | |
|---|---|---|---|---|
| 3,714,438 A | * | 1/1973 | Hahn et al. | 398/182 |
| 3,968,362 A | | 7/1976 | Mocker | |
| 4,176,295 A | | 11/1979 | Driver et al. | |
| 4,209,690 A | * | 6/1980 | Rentzepis | 398/157 |
| 4,406,003 A | * | 9/1983 | Eberly et al. | 398/92 |
| 4,652,079 A | | 3/1987 | Shaw et al. | |
| 4,741,587 A | * | 5/1988 | Jewell et al. | 385/1 |
| 4,863,230 A | * | 9/1989 | Webb | 385/27 |
| 4,883,963 A | | 11/1989 | Kemeny et al. | |
| 5,046,139 A | | 9/1991 | Kahn | |
| 5,077,822 A | | 12/1991 | Cremer | |
| 5,157,745 A | | 10/1992 | Ames | |
| 5,373,389 A | * | 12/1994 | Huber | 398/194 |
| 5,463,493 A | | 10/1995 | Shah | |
| 5,535,050 A | * | 7/1996 | Suyama | 359/341.3 |
| 5,663,824 A | | 9/1997 | Koch et al. | |
| 5,956,139 A | | 9/1999 | Meyer et al. | |
| 6,288,823 B1 | | 9/2001 | Taylor | |
| 6,314,189 B1 | * | 11/2001 | Motoyoshi et al. | 380/278 |
| 6,377,377 B1 | | 4/2002 | Gehlot | |
| 6,678,450 B1 | * | 1/2004 | Franson | 385/122 |

OTHER PUBLICATIONS

Liu et al, "Observation of coherent optical information storage in an atomic medium using halted light pulses", Nature, (Jan. 2001) (advanced publication).*

Phillips et al, "Storage of Light in Atomic Vapor", Physical Review Letters 86, 783 (Jan. 2001).*

Microelectronics Group, Lucent Technologies, Bell Labs Innovations—Technical Note Apr. 1998 re Using the Lithium Niobate Modulator. Electro-Optical and Mechenical Connections.

Microelectronics Group, Lucent Technologies, Bell Labs Innovations—Data Sheet Aug. 2000 re Microwave DFB Laser Transmitters.

(Continued)

*Primary Examiner*—Jason Chan
(74) *Attorney, Agent, or Firm*—Gazdzinski & Associates

(57) ABSTRACT

An improved apparatus and method for enhancing the performance of optical transmission and network systems (such as SONET or SDH). A magnetically trapped atomic cloud chamber is provided which selectively alters the group velocity of light waves propagating through the atomic cloud. A delay device, repeater, pulse shaper, and millimeter wave transmission system incorporating the chamber are also disclosed.

16 Claims, 12 Drawing Sheets

OTHER PUBLICATIONS

Microelectronics Group, Lucent Technologies, Bell Labs Innovations—Product Brief Aug. 2000 re TMODO110G 10 Gbits/s Modulator Driver.

Microelectronics Group, Lucent Technologies, Bell Labs Innovations—Data Sheet Nov. 2000 re 10 Gbits/s Lithium Niobate Electro-Optic Modulator.

Lucent Technologies, Bell Labs Innovations —Wavestar ADM 4/1 Compact and Cost-Effective SDH Multiplexer for STM-1 and STM-4 Applications, 1998.

Spectran White Paper Series—Bandwidth Performance and Control in Multimode Fiber, Sep. 22, 1999.

Observation of cohernet optical information storage in an atomic medium using light pulse artice by Chien Liu, Zachary Dutton, Cyrus H. Behroozi and Lene Vestergaard Hau, Nov. 20, 2000.

Hitachi Telecommunications AMN 6100 System Product Guide, Jul. 2000.

Hitachi AMN 6100 Dense Wavelength Division Multiplexing System. Jun. 1999.

* cited by examiner

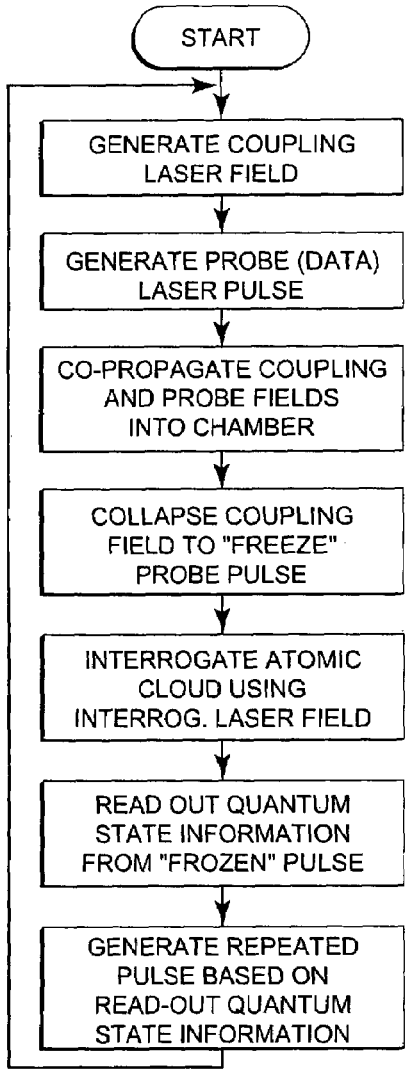
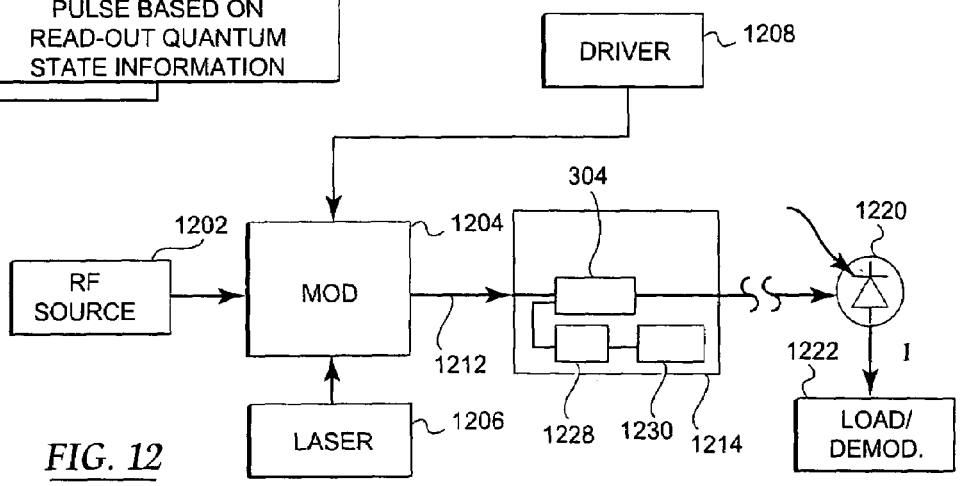
FIG. 11
FIG. 12

OPTICAL COMMUNICATION APPARATUS AND METHODS USING PULSES HAVING MODIFIED PROPAGATION SPEEDS

This application claims priority benefit to U.S. provisional patent application Ser. No. 60/264,477 filed Jan. 26, 2001, and entitled "Optical Communication Apparatus And Methods Using Pulses Having Modified Propagation Speeds."

BACKGROUND OF THE INVENTION

1. Field of the Invention

The present invention relates generally to the field of communications technology, and specifically to the use of pulses of electromagnetic radiation (EMR) within or in conjunction with fiber-optic communication systems and networks for the transmission of data.

2. Description of Related Technology

Light Propagation Speed Experiments

It has recently been demonstrated that the propagation speed of light pulses can be dramatically affected and controlled, and even effectively "stopped" for short periods of time. See Chien Liu, et al, "Observation of coherent optical information storage in an atomic medium using halted light pulses", Nature, (January 2001) (advanced publication), herein after referred to as "Liu"; D. F. Phillips, A. Fleischhauer, A. Mair, R. L. Walsworth and M. D. Lukin from the Harvard-Smithsonian Center for Astrophysics, publishing in *Physical Review Letters* 86, 783 (29 Jan. 2001), hereinafter "Phillips"; Hau, L. V., Harris, S. E., Dutton, Z. & Behroozi, C. H. "Light speed reduction to 17 meters per second in an ultracold atomic gas", Nature 397, 594±598 (1999); Kash, M. M. et al. Ultraslow group velocity and enhanced nonlinear optical effects in a coherently driven hot atomic gas. Phys. Rev. Lett. 82, 5229±5232 (1999); Budker, D., Kimball, D. F., Rochester, S. M. & Yashchuk, V. V. Nonlinear magneto-optics and reduced group velocity of light in atomic vapor with slow ground Electromagnetically induced transparency (EIT) has been observed in various atom-gas systems, as is disclosed in, for example, H. R. Gray et al., Opt. Lett. 3, 218 (1978); M. Kaivola et al., Opt. Commun., 49, 418 (1984); A. Aspect et al., Phys. Reve. Lett. 61, 826 (1988); S. Adachi et al., Opt. Commun., 81, 364 (1991); A. M. Akulsin et al., Opt. Commun., 84, 139 (1991); Y. Q. Li et al., *Phys. Rev., A*51, R1754 (1995); A. Kasapi et al., Phys. Rev. Lett. 74, 2447 (1995). Liu showed that coherent optical information can be stored in an atomic medium and subsequently read out by using the effect of EIT in a magnetically trapped, heavily cooled Bose-Einstein condensed (BEC) sodium atom cloud. The apparatus of Liu al is reproduced (simplified diagram) herein as FIG. 1. It has been experimentally verified by Liu that the repeated and reliable storage of quantum state information associated with a light pulse, and the subsequent "read-out" thereof, are controlled substantially by stimulated photon transfer between two laser fields, specifically those associated with the "probe" resonant pulse and the coupling or interference-producing laser. It has further been experimentally demonstrated that multiple such "read-outs" of a stored pulse can be achieved through the application of a series of short, coupling laser pulses (see, e.g., FIGS. 4*a* and 4*b* of Liu cited above). As illustrated in FIGS. 4*a* and 4*b* of Liu, measurements of multiple (e.g., double and triple) pulse read-outs spaced by up to hundreds of microseconds may be produced using the aforementioned techniques. Advantageously, each of the regenerated probe pulses in such multiple readouts contains a portion of the contents of the atomic memory, notably in the form of energy (i.e., the total energy of the multiple pulses is equivalent to that for a single read-out pulse obtained using a longer coupling laser pulse). Successive depletion of the "quantum memory" occurs for each successive pulse. As pointed out by Liu, et al., such capability is potentially useful for quantum information transfer. Through injection of multiple such "probe" pulses into a Bose-Einstein condensate (e.g., cooled sodium cloud), in which most atomic collisions are coherence-preserving, quantum information processing may be possible during the storage time.

While at a high level similar to Liu, the approach of Phillips used a rubidium vapor cloud ~70-90° C. The rubidium vapor was contained in a cell about 4 cm long. Photons from the signal pulse slowed to about 1 km·s$^{-1}$ in the Phillips vapor cell. "Trapping" of photons for hundreds of microseconds was exhibited. Phillips identifies that the information from the photons is stored or reflected in the spin states of atomic electrons.

Unfortunately, while very compelling, the aforementioned disclosure by Liu (as well as the other references cited) make little if any practical application of their findings.

Optical Communication Systems

Traditional fiber optic communication systems utilize pulses or waves of light energy which propagate in one or more modalities along a conduction medium, typically an optical fiber adapted to carry such pulses or waves efficiently at the desired wavelengths. In long fiber transmission lines, the pulses or waves must be periodically regenerated or amplified due to losses inherent in the transmission medium and the pulses/waves themselves. The amplification function is often performed by amplifiers such as Erbium Doped Fiber Amplifiers (EDFAs) of the type well known in the art. The amplifier is able to compensate for power loss due to signal absorption in the optical fiber, but it is generally unable to correct the signal distortion caused by related to any number of attendant factors including "chirping", linear dispersion, wave mixing, polarization distortion and other propagation-related or timing effects. Additionally, noise accumulated along the transmission line is not addressed by such EDFAs or other amplifiers.

Wave division multiplexed (WDM) networks typically use modulated lasers as the source of laser light, as previously described. However, the pulses produced by such lasers in the WDM context are often characterized by chromatic dispersion of the pulses. Specifically, the leading and trailing edges of the pulse(s) typically includes multiple frequency components that are changing from one state to another (e.g., "low" to "high"). When transmitted over an optical fiber, such pulses experience a phenomenon commonly referred to as "chirping", which ultimately reduces the distance a train of closely spaced pulses can be transmitted without overlap between individual pulses in the train. Obviously, such overlap detracts from the signal quality, and the ability to recover the signal information at the receiver end of the transmission line.

One approach to improving the quality of pulses from a directly modulated laser comprises passing the pulses through a narrowband filter to remove unwanted transitional frequency components at the leading and trailing edges of the pulses.

Another approach used in soliton systems comprises a non-return-to-zero (NRZ) electro-absorption optical modulator with a soliton pulse shaper, which attenuates the regions of highest transient chromatic dispersion generated by the NRZ modulator.

In spite of the foregoing filtering/shaping techniques, the optical signal must periodically be regenerated, especially after a cascade of multiple amplifiers (such as would be encountered over a long distance transmission path). Many factors including those relating to the initial laser source, input signal, transmission fiber, and amplifiers contribute to the determination of the distance at which regeneration must occur. Typically, regeneration of the signal is performed with electronic repeaters operating on the principle of optical-to-electronic conversion. However, there are significant drawbacks associated with such conversion, including increased cost, and generally complex and often error-prone supporting/compensating electronics. Ideally, the repeating process would remain entirely in the optical domain.

SUMMARY OF THE INVENTION

In a first aspect of the invention, an improved apparatus and method for providing a selective progagation delay within an optical transmission system (such as a Synchronous Optical Network/Synchronous Digital Hierarchy {SONET/SDH} OC-48 network) is disclosed. The apparatus comprises a magnetically trapped, cold "atomic cloud" (MTACC) delay device having a coupling laser for providing electromagnetically induced transparency (EIT) in the cloud, the delay device being useful for various optical communication and networking applications (e.g., for mode-locked WDM laser). In a first exemplary embodiment, the temporal delay induced by the MTACC device is controllable based on the selected shut-off period of the coupling laser, up to roughly 1 ms. In another exemplary embodiment, the delay is varied by changing the propagation speed of the pulse(s) through the atomic cloud to the degree required to produce the desired temporal delay. The propagation speed is variable based on, inter alia, the laser cooling/temperature and RF evaporation of the atom cloud in the chamber. Temperature is controlled by the application of pulsed EMR to the atom cloud by a microwave source device and waveguide. In another embodiment, A variable delay line is provided wherein the delay is variable over a broader temporal range by using a multistage delay network. The network comprises plurality of MTACC delay chamber elements arranged in a cascade configuration which are each capable of producing variable delays up to 1 ms. Optical splitters are used to selectively route the desired number of pulses to the appropriate chamber element, wherein the desired delay is applied. Variable total delays which are the sum of the individual (variable) path delays are provided, with the total delay being N times the maximum delay provided by any single chamber element, wherein N comprises the number of cascaded chamber elements in the network. The path lengths of the individual paths are equilibrated such that no delay due to different path length is imposed. Alternatively, the total path lengths are adjusted using, for example, conventional wound core delay lines, to impart desired fractional delays. In an exemplary configuration, the network and chambers are physically integrated into a unitary device, and the desired time delay determined using an algorithm running on a high speed RISC processor adapted to perform the iterative time delay network calculations. Control of the optical modulators controlling the variable delay of each chamber is accomplished using a micro-controller coupled to the RISC processor.

In a second aspect of the invention, an improved apparatus and method for storing an optical pulse or pulse train within an optical transmission system is disclosed. Such stored pulse(s) may be used for a variety of functions such as error detection/correction (EDC), or lost pulse regeneration. In one exemplary embodiment, the apparatus comprises an optical "FIFO buffer" having a MTACC device adapted to store a plurality of light pulses transmitted across an optical communication system. The pulse or pulses are split off of the transmission path via an optical splitter and periodically stored within the atomic medium of the MTACC using a coupling wave. The pulse (train) is spatially compressed and "frozen" within the chamber for a predetermined period of time, and then shifted out of the buffer and selectively discarded or alternatively reintegrated with the transmission path, based on EDC testing performed at the next downstream receiver or repeater. When a given pulse (or train) is shifted out of the buffer, a new pulse (or pulse train) is shifted in. Spatial pulse compression within the atomic cloud allows the storage of multiple pulses within the MTACC while the coupling wave is applied. In another embodiment, multiple FIFO buffers are coupled and synchronized to store progressively larger pulse trains. In yet another embodiment, one or more FIFO buffers are used to store pulse trains distributed on a plurality of wavelengths, such as is present on the optical fiber of a wave division multiplexing (WDM) or dense WDM (DWDM) system.

In a third aspect of the invention, an improved apparatus and method for repeating optical transmission signals is disclosed. The repeater generally comprises the aforementioned MTACC device interposed between other system elements (such as between an Erbium doped fiber amplifier (EDFA) and downstream receiver), the MTACC being adapted to induct optical pulse of the desired wavelength(s) and spatially and temporally compress them within the MTACC chamber, as previously described. In one exemplary embodiment, the compressed. "frozen" pulses are then "unfrozen" and read out of the MTACC, and "chopped" using an high speed optical modulator with very short state transition (switching) time. The chopped pulses (which are lower in total energy than the corresponding un-chopped pulse due to elimination of the "trailing" wavelengths resulting from chromatic dispersion) are then re-amplified by an EDFA or other amplifying device and transmitted to the distant receiver. Such "freezing" and "chopping" obviates the need for an electro-optic interface such as commonly used in the prior art to repeat pulses.

In another embodiment, the repeater is adapted to multiply the number of read out pulses through the application of pulsed coupling energy applied approximately coincident with applied windowing functions at the outlet of the MTACC.

In a fourth aspect of the invention, an improved apparatus and method for transmitting millimeter waves across an optical transmission system with a delay is disclosed. In one exemplary embodiment, delay is provided through the use of one or more magnetically trapped atomic cloud chambers (MTACCs) of the type previously described in conjunction with the optical transmission system. The millimeter wave signal to be transmitted varies in intensity; this variation modulates the output of a "probe" laser source, using for example an Lithium Niobate optical modulator. The modulated light emanated from the probe laser is transmitted through a length of optical fiber (and any interposed repeating devices), and subsequently detected by a millimeter wave bandwidth photodiode whose output is an electrical current proportional to the intensity of the received light pulses generated by the probe laser. The diode output current is electrically is coupled to the load and demodulated to recover the millimeter wave signal. Variable time delay is accomplished using an interposed MTACC device, the delay imposed by the MTACC controlled via an optical modulator applied to the output of an associated coupling laser source.

In a fifth aspect of the invention, an improved apparatus and method for processing optical transmission pulses during transmission is disclosed. The technique generally comprises transmitting at least one optical pulse through an optical transmission medium (e.g., optical fiber), inserting the pulse(s) into an MTACC device, "freezing" the pulse(s) in the MTACC device for period t; and processing the quantum information within the pulse(s) obtained from the pulse(s) during the period t. In one exemplary embodiment, the processing of pulse quantum information comprises reading out the quantum information from the pulse(s) during the period t, and performing subsequent processing, analysis, storage, or other functions (such as distribution or repeating) contemporaneously. In another embodiment, pulse shaping (via coupling field intensity) is performed during frozen pulse ejection from the MTACC.

BRIEF DESCRIPTION OF THE DRAWINGS

FIG. 10b is a functional block diagram illustrating the repeater apparatus used in the network of FIG. 10a.

FIG. 11 is a logical flow diagram illustrating the methodology of interrogating a pulse stored in the MTACC to determine quantum state information stored in the atomic cloud.

FIG. 12 is a functional block diagram of one exemplary embodiment of the millimeter wave transmission delay system of the invention.

DETAILED DESCRIPTION OF THE PREFERRED EMBODIMENTS

Figure 1:
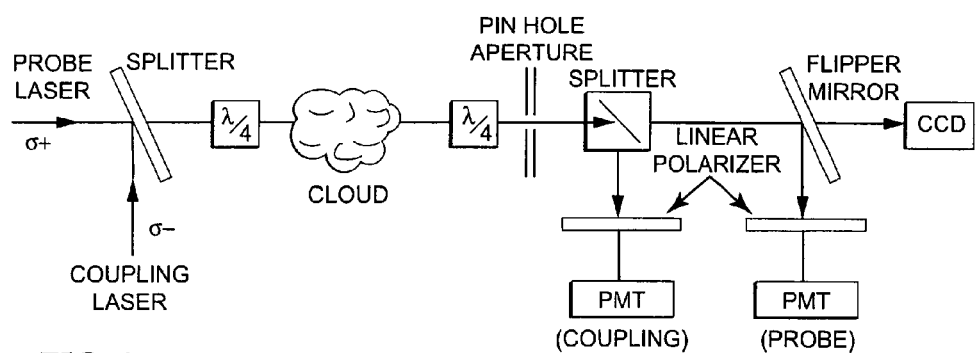
FIG. 1 is a functional block diagram of the prior art experimental apparatus of Liu, et al.

Reference is now made to the drawings wherein like numerals refer to like parts throughout.

Definitions

As used herein, the term electromagnetic radiation (EMR) shall mean any portion of the electromagnetic spectrum, including millimeter (micro) waves, infrared, visible, and ultraviolet, regardless of origin or mechanism by which generated.

The term "single mode" shall mean an optical device having only one guided mode. The number of guided modes in a fiber is related to the normalized frequency (V) for that fiber; if V is less than 2.405 (for step-index cylindrical waveguide), the fiber can only support one mode. If V is greater than 2.405, the fiber can support multiple modes (i.e., a "multimode" fiber).

As used herein, the term "index of refraction" shall mean the ratio of velocity of EMR (e.g., light) passing through a material to the velocity of that EMR passing through a vacuum using light at a given reference (e.g., Sodium "D" line).

As used herein, the term "numerical aperture" shall mean a measure of the capture angle of EMR, including the maximum angle of EMR rays that will be reflected down the transfer medium (e.g., fiber) by total reflection. Numerical aperture (NA) is given by Eqn. 1:

$$NA = \sin\theta = SQRT(n_1^2 - n_2^2) \qquad (\text{Eqn. 1})$$

Where:
$n_1$=refractive index of core
$n_2$=refractive index of clad

As used herein, the term "losses" shall mean losses of light energy/intensity of any kind. The light loss or attenuation through a medium is expressed in dB/length:

$$dB = 10 \log_{10} I/I_0 \qquad (\text{Eqn. 2})$$

Where $I/I_0$ is the ratio of light intensity at source to that at the distant end of medium.

As used herein, the term "bandwidth" shall mean the measure of the information carrying capacity of the medium, whether given as pulse dispersion in nanoseconds/length, bandwidth length in MHz—unit length, or other measure. In general, large bandwidth and low losses favor optical media with small core diameter and small NA.

The term "polariton" refers to the combination of an electromagnetic energy pulse and any resulting atomic polarizations induced by its presence in a medium through which the pulse is travelling.

The term "probe laser" refers to any stimulated radiation emission system (including those based on light or microwaves), regardless of lasing medium, which is used to generate a pulse or continuous wave (CW) capable of transmitting information.

The term "coupling laser" refers to any stimulated radiation emission system (including those based on light or microwaves), regardless of lasing medium, which is used to generate a pulse or continuous wave (CW) adapted to couple to the field(s) generated by the aforementioned probe laser to induce at least a partial state of electromagnetically induced transparency (EIT) within a medium.

The term "dispersion" refers to any temporal or spatial dispersion of a pulse, whether due to chromatic dispersion, intermodal dispersion, or otherwise.

As used herein the term "soliton" refers to light pulses which are substantially non-dispersive. Soliton pulses arise from the property of optical fiber whereby a pulse can be prevented from dispersing by taking advantage of non-linear behavior; i.e., as the intensity of light passing through a fiber increases, the velocity decreases. At high intensities, the pulse is compressed so as to create bright pulse soliton (i.e., wave that substantially retains shape).

As used herein, the term "Bose-Einstein Condensation" and "Bose-Einstein Condensate" refers to any condition or species of matter (e.g., gases or "superfluids") whereby the ground state is preferentially or disproportionately populated at low temperature.

Theoretical Background—Bose-Einstein Condensation

Atoms are normally considered as particles but, according to quantum mechanics doctrine, they also have wave-like properties. As groups of atoms are cooled, their velocity decreases and their deBroglie wavelength increases. Bose and Einstein predicted that at a low enough temperature, the wavelength exceeds the inter-particle spacing, and the atoms ("bosons") begin to effectively "overlap." The atoms enter, by a process called Bose-Einstein condensation (BEC), a substantially coherent state where the behavior of the macroscopic system is dictated largely by the laws of quantum mechanics. Such laws dictate in part that systems of integral spin are described by symmetric wave functions ψ BEC has been observed in various media, including superfluid helium-4 (He$^4$) and super-conductive materials, both being states of matter in which integral-spin bosons condense into macroscopic quantum states.

As is well understood in statistical mechanics, bosons obey different rules regarding the maximum value of the occupation number $n_j$ than other types of particles. Bosons characteristically occupy $n_j$ in any number from 0 to infinity, thereby complying with Bose-Einstein statistics. The grand partition function $\mathcal{Z}_{BE}$ is generally written in the form of Eqn. 3:

$$\mathcal{Z} = \sum_v W_v \exp\left[(1/kT)\sum_j n_j(\mu - \epsilon_j)\right] \quad \text{(Eqn. 3)}$$

where:
  $W_v$=work for system in state v
  T=absolute temperature (degrees Kelvin)
  nj=occupation number for state j
  μ=chemical potential
  ∈=energy of particle in state j
for bosons is given generally by Eqn. 3:

For bosons, Wv is unity, and the grand partition function can be expressed in the form of Eqn. 4:

$$\mathcal{Z}_{BE} = \sum_{n_1, n_2, \ldots} \left[\exp(1/kT)\sum_j n_j(\mu - \epsilon_j)\right] \quad \text{(Eqn. 4)}$$

$$= \sum_{n_1} e^{n_1(\mu-\epsilon_1)/kT} \sum_{n_2} e^{n_2(\mu-\epsilon_2)/kT} \ldots = \mathcal{Z}_1 \mathcal{Z}_2 \ldots$$

where:
$$\mathcal{Z}_j = [e^{(\epsilon-\mu)/kT} - 1]^{-1} \quad \text{(Eqn. 5)}$$

Hence, the grand partition function of Eqn. 4 for bosons may be separated into factors correlating to each of the particle states. This is in contrast to separation of states for each particle. The grand potential and the mean number of boson particles are given by Eqn. 6 and Eqn. 7, respectively:

$$\Omega_{BE} = -kT\ln\mathcal{Z}_{BE} = kT\sum_j \ln\left[1 - e^{(\mu-\epsilon_j)/kT}\right] = -PV \quad \text{(Eqn. 6)}$$

Where:

$$\overline{N} = -\frac{\partial\Omega_{BE}}{\partial\mu} = \sum_j \overline{n}_j \quad \text{(Eqn. 7)}$$

$$\overline{n}_j = [e^{(\epsilon_j-\mu)/kT} - 1]^{-1}$$

Where:
  $\Omega_{BE}$=grand potential
  $\overline{N}$=mean number of particles in boson system Based on the allowed energy values and the temperature T, the lower energy states where (∈j–μ) is equal to or smaller that kT, the $n_j$ for the boson is appreciably greater than that for comparable Maxwell Boltmnan (MB) particles. Hence, bosons tend to "condense" into their lower states at lower temperatures. Above a limiting temperature Tb, the ground state is no more densely populated than other states. However, at temperatures below Tb, the ground state is more preferentially populated. The volumetric heat capacity $C_V$ of the gas as a whole, as a function of, T has a marked discontinuity at Tb, corresponding to this condensation phenomenon. This condensation is not necessarily condensation or localization in spatial terms, as is the case for condensation of vapor phase matter into the liquid phase, but rather momentum space, with ground state boson particles distributed spatially. At temperature T=0, the value of $C_V$ is also zero. Hence, the condensed boson particles are effectively "frozen" in momentum space (i.e., p=0), distributed at random throughout the gas cloud, having both zero entropy and energy.

The particle energy e is given generally by the kinetic energy formulation of Eqn. 8:

$$p^2/2m \quad \text{(Eqn. 8)}$$

where:
  p=momentum
  m mass of the boson particle

Integrating over phase space, the number of particle states in an element in phase space defined by:

$$(dxdydz) \times (dp_x dp_y dp_z) = dV_p \quad \text{(Eqn. 9)}$$

where:

d_=differential of_

Vp=volume (constant pressure), is given by $g(dV_q\, dV_p/h^3)$, where g=multiplicity factor induced by boson particle spin. If no magnetic field is present, g=(2S+1) different spin orientations having the same energy e. With magnetic field applied, the form of g is varied; see the discussion of "magnetic trapping" below.

The foregoing model must further include an extra integral term for the number of boson particles occupying state e=0 ($\overline{N}$). The number of particles occupying the condensed state is given by Eqn. 10:

$$N_c = \overline{N}[1-(T/T_b)^{3/2}] \quad \text{(Eqn. 10)}$$

Particles in this state exert no pressure and more importantly carry no energy. Interestingly, pressure in the ground state is independent of volume. Further reductions of volume merely condense more particles into the ground state. Hence, Using this information, the combination of chamber pressure, volume, and boson gas temperature can be used to manipulate the value of $\overline{N}$ in order to achieve a near-perfect boson condensation state (i.e., effectively all of the particles in the distribution condensed into the ground state, and frozen in momentum space).

Magnetic Trapping

Magnetic trapping is a technique well known in the art. Polarized atoms are magnetically trapped in an applied potential trap, which uses a small, uniform transverse field. The trap adiabatically compresses the gas to reach the starting conditions for evaporative cooling at roughly 90 degrees K, with an atomic density of about 1 E10 cm$^{-3}$. Evaporative cooling involves the preferential removal of the most energetic atoms from a sample. Such density is sufficiently large for the elastic collision rate to dominate over the loss rate in the gas. BEC is subsequently achieved with several million atoms at a temperature approaching zero degrees Kelvin.

Once the condensate has formed, the above-condensate particles are removed using, for example, applied radio-frequency energy, enabling almost instant cooling to immeasurably low temperatures and leaving an essentially pure condensate. Since the compressibility of a Bose-Einstein condensate is under certain conditions infinite, the condensate will be compressed by the trapping potential until the inter-atomic interactions counterbalance the potential, thus affecting the size and shape of the condensate.

Figure 2:
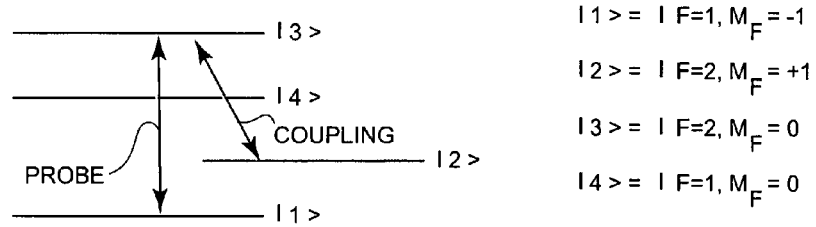
FIG. 2 is a graphical representation of the three-level electromagnetically induced transparency (EIT) arrangement used in conjunction with the present invention.

With the coupling and probe lasers, the BEC gas atoms may be modeled as multi-level groups of atoms interacting with the probe and coupling laser fields. FIG. 2 illustrates these interactions graphically. Per Liu, a stationary eigenstate can be demonstrated for the system of a three-level atom for certain conditions (i.e., under perfect EIT conditions, and two-photon resonance), with coherent superposition of states|1} and |2}, as shown in Eqn 11:

$$|D\rangle = \frac{\Omega_c|1\rangle - \Omega_p|2\rangle \exp[i(k_p - k_c) \cdot r - i(\omega_p - \omega_c)t]}{\sqrt{\Omega_c^2 + \Omega_p^2}} \quad \text{(Eqn. 11)}$$

where:
Ωp=Probe laser Rabi frequency
Ωc=Coupling laser Rabi frequency,
κp=probe wave vector
κc=coupling laser wave vector,
ωp=probe laser optical angular frequency
Ωc=coupling laser optical angular frequency The Rabi frequencies are defined as per Equations 12a and 12b:

$$|D\rangle = \frac{\Omega_c|1\rangle - \Omega_p|2\rangle \exp[i(k_p - k_c) \cdot r - i(\omega_p - \omega_c)t]}{\sqrt{\Omega_c^2 + \Omega_p^2}} \quad \text{(Eqn. 11)}$$

where:
e=electron charge,
$E_p$=probe laser electric field amplitude
$E_c$=coupling laser electric field amplitude
e·$r_{1,3}$=dipole moment, atomic transition state 1→3 (see FIG. 2)
e·$r_{2,3}$=dipole moment, atomic transition state 2→3 (see FIG. 2)
η=Planck's constant/2π

Portions of the atomic cloud within the pulse locality are driven into a dark-state superposition (comprising states |1) and |2)), the superposition being determined by the ratio of the instantaneous Rabi frequencies of the laser fields as reflected in Eqn. 11. Note that the so-called "dark" state of Eqn. 11 above does not couple to state |3} of FIG. 2, which eliminates absorption of the fields. The presence of the coupling laser field creates an EIT and the cooled atomic cloud combine to generate a steep refractive index profile, and very low group velocity Vg for the probe pulse as it traverses the cloud. As the pulse enters the atomic medium, it is spatially compressed by a factor c/Vg (described in greater detail below), whereas its peak field amplitude remains constant.

Apparatus and Method for Delay Line

Referring now to FIGS. 3 through 6, an improved apparatus and method for providing a selective propagation delay within an optical transmission system is described. It will be recognized that while the following embodiment is described in terms of a single wavelength optical transmission system (i.e., non wavelength-division multiplexed) for purposes of illustration, the invention is equally applicable to WDM or DWDM systems.

It will be recognized that while the following apparatus and methods are described primarily in terms of a super-cooled cloud of sodium (Na) atoms of the variety presented in Liu, these apparatus and methods may be readily adapted to use of other types of atomic media (e.g., rubidium) held at other temperatures, as in Phillips. Hence, the exemplary embodiments are only illustrative of the broader concepts of selectively controlling the propagation and/or parameters of light energy propagating through the medium according to the invention.

Figure 3:
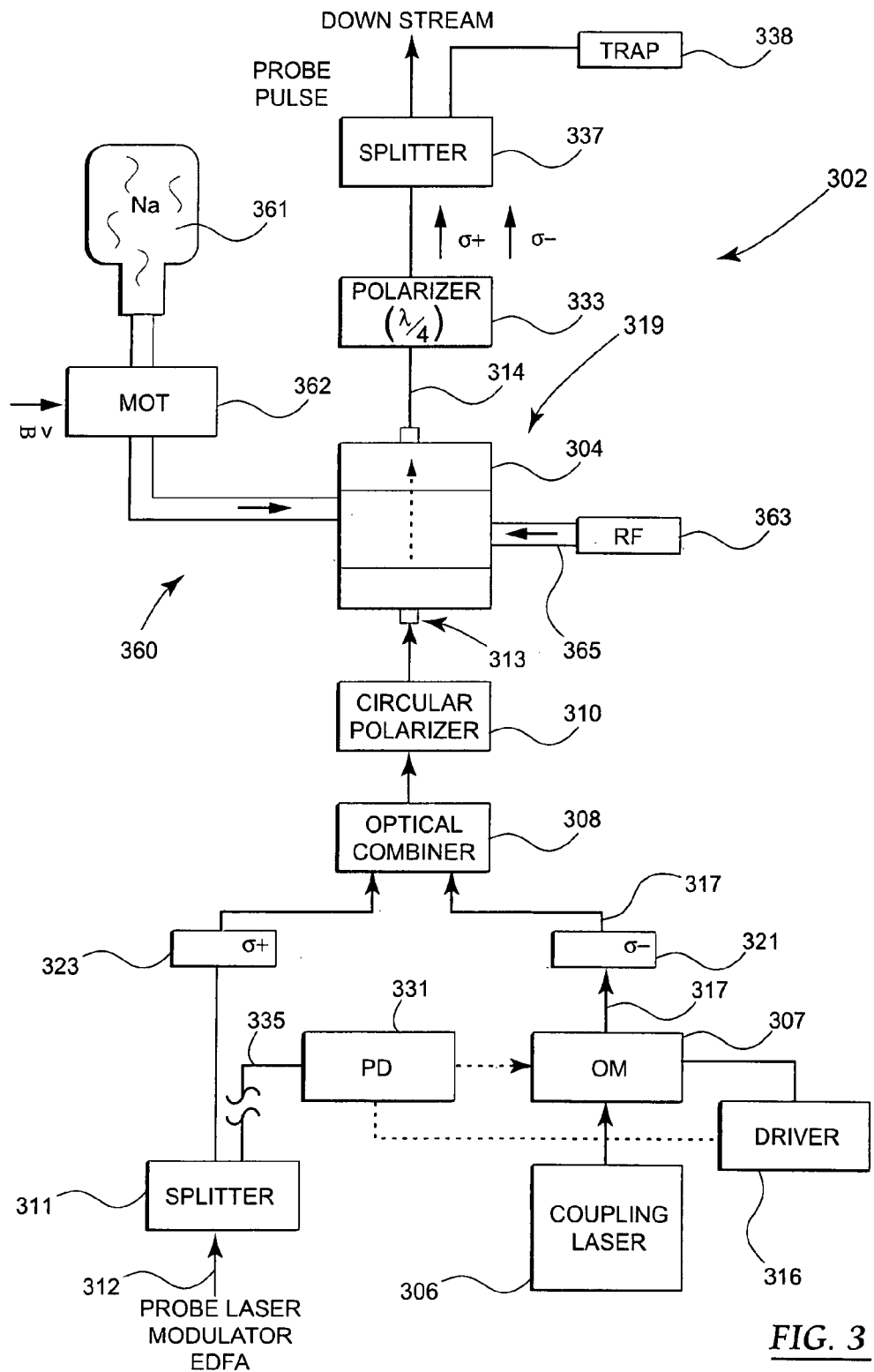
FIG. 3 is a functional block diagram illustrating one exemplary embodiment of the optical delay apparatus of the present invention.

As shown in FIG. 3, one exemplary embodiment of the apparatus comprises a magnetically trapped, cold "atomic cloud" (MTACC) delay device 302 having a cloud chamber 304, coupling laser 306 with optical modulator 307 (and driver 316) and optical fiber 317 with sigma− polarizer 321, optical combiner 308, circular quarter-wave (λ/4) polarizer 310, probe pulse input fiber 312 with splitter 311, sigma+ polarizer 323 coupled to the optical combiner 308, which is coupled to the quarter-wave (lambda/4) polarizer 310 and then the first distal end 313 of the chamber 304, and output fiber 314 coupled to the other distal end 319 of the chamber 304. A photodiode 331 is provided, being coupled to the secondary fiber 335 from the splitter 311.

The embodiment of FIG. 3 further includes a quarter-wave output polarizer 333 which separates the coupling and probe (data) components of the output pulse(s) into their original orthogonal polarizations. The polarized laser pulses are then separated in a splitter 337 based on polarization, with the coupling laser pulse being "dumped" to a trap 338, and the probe(data) pulse being sent on for further processing, amplification, transmission, etc.

The coupling laser 306 comprises a semiconductor laser of the type well known in the art. In the present embodiment, a Lucent Technologies 10 mW Model D2525P distributed feedback (DFB) CW laser with polarization-maintaining fiber is used, although others may be substituted. The optical signal is a CW beam at approximately 1550 nm. The coupling and probe lasers are tuned according to Eqn. 11 above such that stimulated photon exchange between the fields thereof generates an EIT for the resonant pulses injected by the probe laser. Specifically, as identified by Liu, a "dark" superposition of states |1⟩ and ★2⟩ previously described with respect to FIG. 2 herein occurs. In the illustrated embodiment, the coupling laser 306 is resonant with the |2⟩→|3⟩ transition. The probe laser is tuned resonant to the |1⟩→|3⟩ state transition.

The optical modulator 307 comprises a Lucent 2623-series 10 Gbits/s lithium niobate electro-optic modulator (EOM) operating at 1525-1560 nm nominal. This 10 Gbits/s EOM is designed for long-wavelength, single-mode amplitude modulation applications. The EOM uses an integrated Mach-Zehnder configuration to convert the single polarization CW light received from the coupling energy source 306 semiconductor (DFB) laser into a time-variant non-return-to-zero (NRZ) optical output signal. As is well known, $LiNbO_3$ modulators of the present type require various inputs, including (i) the optical CW signal; and (ii) an RF data signal. A Lucent LG 1018A 10 Gbits/s modulator driver is used to provide the RF input in the illustrated embodiment, as triggered by the photodiode 331. At 10 gigabits per second, switching times on the order of picoseconds are achievable, thereby allowing for extremely rapid collapse of the coupling field induced by the coupling laser 306 (i.e., "quick freeze").

The photodiode 331 is electrically coupled to the modulator 307 and driver 316 to provide triggering information for the optical modulator, the triggering information being derived from the fractional optical pulse carried on the secondary fiber 335 indicating the presence of a data ("probe") pulse to be "frozen" in the delay device. The timing relationship between the split optical pulse, photodiode, and optical modulator (and driver) is such so as to trigger collapse (and subsequent re-establishment) of the coupling laser field within the chamber 304 after entry of the (remaining fraction of the) original data pulse, thereby inducing short term quantum "memory" of the resonance pulse in the chamber. Any conventional timing device (electronic or optical, such as a wound core optical delay line) may be used in the splitter-photodiode-modulator loop to control timing. The construction and operation of photodiodes and splitters such as those used in the present embodiment is well known in the fiber optic arts, and accordingly are not described further herein.

Figure 3A:
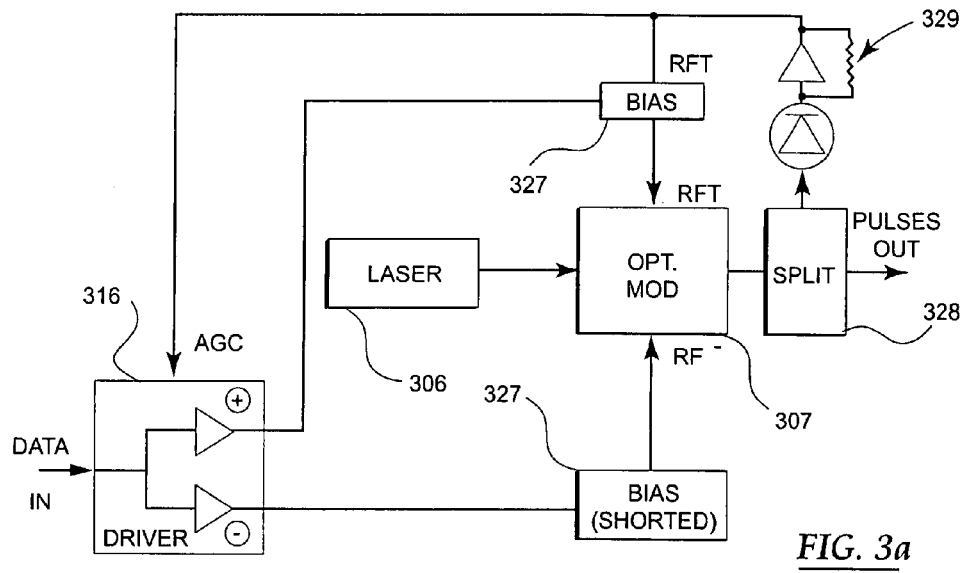
FIG. 3a is a functional block diagram of one exemplary embodiment of the coupling laser and support component configuration used in the apparatus of FIG. 3.

FIG. 3a illustrates one exemplary configuration of the coupling laser source/driver/modulator arrangement of the present invention. As illustrated, the coupling laser 306 inputs a CW laser signal into the modulator 307, the latter being controlled by the driver circuit 316 via a set of bias tees 327, optical splitter 328, and photodiode/pre-amp 329.

The optical input fiber 317 comprises a single mode MCVD-fabricated and clad optical fiber such as the Tru-Wave® or AllWave® products manufactured by Lucent Technologies. It is recognized that while the present discussion and apparatus are cast in terms of single mode fibers, the general principles of the invention may be applied equally to multi-mode fibers and transmission/reception apparatus of the type well known in the art if desired.

The $sigma^-$ polarizer 321 at the output of the optical modulator 307 is used to impart a polarization plane to the coupling laser pulses which is orthogonal to that imparted by the probe pulse ($sigma^+$) polarizer 323.

An optical combiner 308 is interposed between the sigma-polarizer 321 and the quarter-wave polarizer 310. Literally any type of optical combiner which maintains the aforementioned orthogonal polarization and pulse coherency may be used, such devices being well known to those of ordinary skill. The function of the optical combiner 308 is to combine coherent energy emitted by the coupling laser 306 and the probe pulse laser (not shown) into co-propagating signals of the aforementioned polarizations and modalities.

The probe pulse laser (not shown) may comprise apparatus functionally identical to that of FIG. 3a, or alternatively any other arrangement capable of producing coherent light pulses of suitable wavelength and polarization so as to induce resonance with the coupling energy as previously described. Solid state Nd vanadate lasers ($Nd:YVO_4$) could also be used the present application with proper adaptation. These diode pumped lasers produce a train of pulses of about 5 ps duration (which could be compressed externally to the laser to 100 fs). Solid state Cr:LiSAF Lasers (also Cr:LiSGAF and Cr:LiCAF) are another option; tunable pulse generation in the range of 820 nm to 880 nm has been demonstrated, and pulse duration as short as 20 fs has been obtained. Alternatively, a light-emitting diode (LED) with suitable chromatic dispersion characteristics (and associated modulation technique) may be used. Many other variants are possible, all considered within the scope of the invention defined by the claims appended hereto.

Figure 3B:
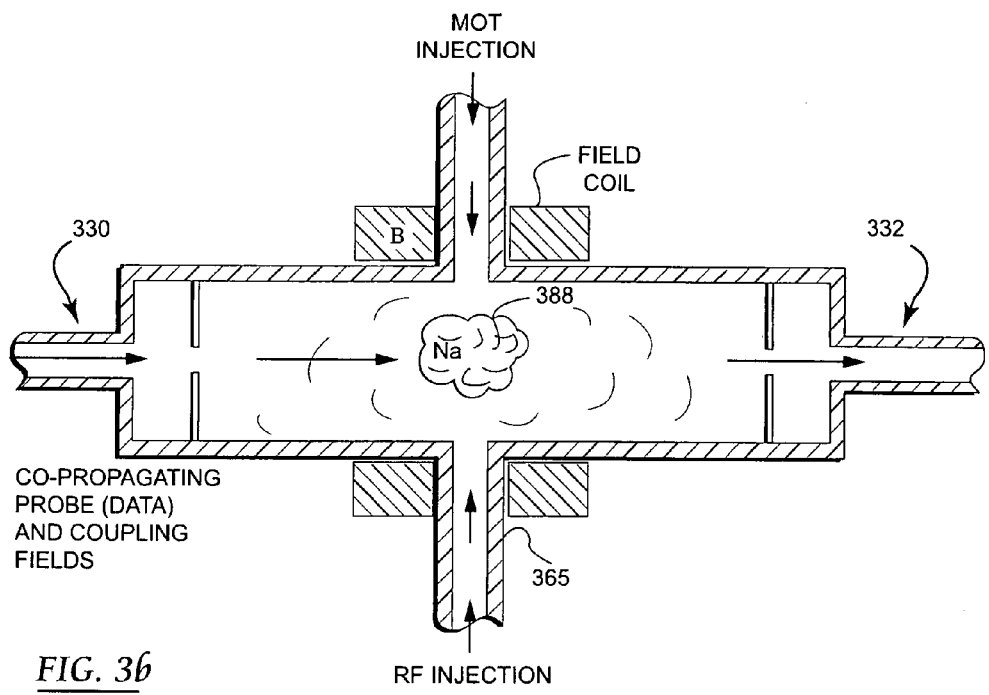
FIG. 3b is a cross-sectional diagram of the delay chamber of the apparatus of FIG. 3, illustrating the interior arrangement of the chamber.
Figure 4:
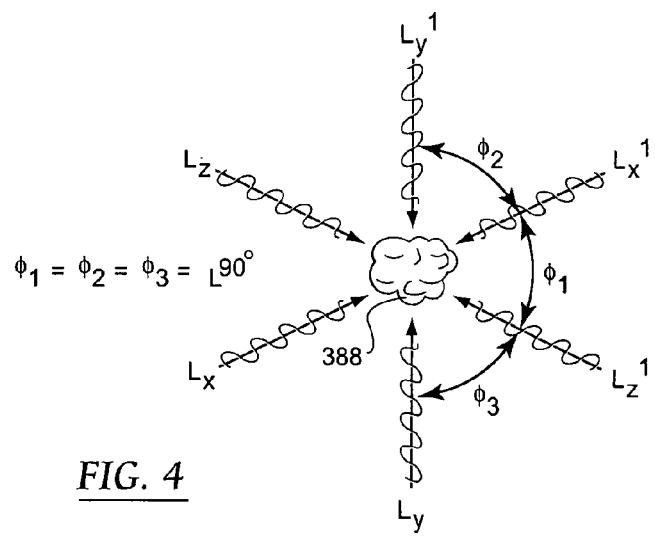
FIG. 4 is a graphical representation of the counter-propagating cooling laser arrangement used in the MOT device of the present invention.

As shown in FIG. 3b, the chamber 304 of the present embodiment comprises an elongate cylindrical vessel having apertures 330, 332 at each distal end adapted to receive the distal end of the input fiber. The chamber is mechanically adapted to withstand the extremely low temperatures of the sodium (Na) BEC cloud (and non-condensed state particles) contained therein. In one embodiment, DT 304 stainless steel is used as the chamber material, although other materials (such as inconel, titanium, ceramics, or even certain polymers) may be used with proper adaptation. Evaporative cooling apparatus of the type well known in the art is coupled to the chamber, as described in greater detail below. A series of pinhole apertures 340 are aligned with the input and output fibers such that the portion of the co-propagating laser energy which passes through BEC cloud 388 condensed within the central region of the chamber 304 is collimated; i.e., only energy passing through both apertures 340 and the input fiber will be received and coupled to the output fiber 314. The interior dimensions of the chamber 304 are approximately right cylindrical, and a total chamber volume of 1.03 E09 microns$^3$. The atomic Na cloud of the embodiment described above with respect to FIG. 3 is on the order of 1 E10 atoms, based on density of approximately 10 atoms per cubic micron after laser cooling and evaporation. It will be noted that while sodium is chosen as the atomic species in the embodiments illustrated herein, other atomic species, such as He$^4$, having a lambda-type phase change at approximately 2.2 degrees K (corresponding to onset Bose-Einstein condensation), may be used as a substitute, assuming that the apparatus is properly adapted therefore.

It is noted that when using a higher temperature (e.g., rubidium) vapor such as in Phillips, additional apparatus for limiting "wander" of the gas cloud atoms from the localized region of pulse propagation may be necessitated. Specifically, under such higher temperature conditions, atoms of the gas wander out of this region and collide with other atoms (at high atomic densities), thereby inducing spin-exchange interactions in which the coherence of the spin states would decay. Such spin state decay reduces the storage longevity of the pulse(s) significantly.

However, despite the effects of cloud atom wander and more rapid loss of coherency (thereby less information storage and less "stopping" delay), such higher temperature "vapor" systems have the advantage of requiring less infrastructure to support creation of the proper conditions in the higher temperature (e.g., roughly 90 C) cloud.

As shown in FIG. 3, a laser cooling stage 360 is provided to gather and pre-cool the sodium atoms prior to condensation. In one embodiment, the sodium atoms are gathered from a sodium vapor 361 into a "dark" magneto-optical trap (MOT) 362 of the type known in the art. The collected gas is rapidly pre-cooled in the MOT 362 to about 20 degrees K and subsequently magnetically polarized in a magnetic bias (B) field using optical pumping. The polarized atoms are then magnetically trapped in a potential trap, which in one variant consists of a set of coils in anti-Helmholtz configuration with a small, superimposed rotating uniform transverse field. The potential trap provides a substantially harmonic potential with a low axial and radial frequency. In the potential trap, the gas is adiabatically compressed to reach the necessary starting conditions for evaporative cooling (about 80 degrees K) with an atomic number density on the order of 1 E10 cm$^{-3}$. Such atomic density is sufficiently large to increase the rate of elastic collisions between atoms above the loss rate. Evaporation in the present embodiment is induced by RF energy injection via a millimeter wave source 363 and waveguide 365, which produces a transition of the atoms at the periphery of the cloud to an "untrapped" state. Upon completion of evaporation, BEC is achieved with roughly 1 E06 atoms at approximately 170 nK. The chamber 304 may also be configured as a resonant cavity (with high Q) with out without associated dielectrics for the purposes of efficient evaporation.

As illustrated above, it is possible to trap up to 1E10 atoms and cool them down to temperatures of a few micro-Kelvin using an MOT. To cool and confine the sodium (or other selected) atoms, damping and restoring forces are needed. These forces can be achieved by any number of means including, inter alia, a spontaneous light force with resonant laser-light. Specifically, an atom which absorbs photons from a laser pulse receives a non-zero momentum from the absorbed photons corresponding to the direction of photon (laser pulse) propagation. These absorbed photons excite the absorbing atom. The direction of the fluorescence photons which are spontaneously emitted from the excited atom are generally isotropic in spatial distribution. Hence, no contribution is made by the ejected photons to the momentum of the atom. FIG. 6a illustrates this process graphically.

For cooling atomic cloud gas, the velocity distribution of the atoms has to be shifted to the lower (or zero) velocities. Such shifting can be achieved by using three orthogonal pairs of counter-propagating lasers (FIG. 4), thereby canceling out any net momentum induced by a single laser beam in a given direction. The frequency of the laser beams injected into the cloud 388 is slightly red-shifted (longer wavelength) from the atomic resonance wavelength, so that an atom having a velocity component co-linear with the red-shifted beam will see a blue-shifted (shorter wavelength) frequency due to of the Doppler effect. As a result the atom is decelerated due to resonance. Such three-dimensional "Doppler-cooling" strongly damps the atoms and sets up a containment of sorts in the interaction area of the laser-beams (i.e., "optical molasses").

A position dependent restoring force is also utilized to effectuate atom trapping. This is accomplished by making the absorption probability for photons from the laser pulses position dependent, such as by using the Zeeman effect in a magnetic (B) field. The polarization state of the laser-light is also controlled to assist in generating the desired restoring force.

It will be evident from the foregoing discussion that myriad configurations of MOTs have been developed, and may be utilized consistent with the present invention, dependent on various factors including, for example, the atomic species selected, the desired cooling, and desired atomic density. See, for example, Engler, Hans, et al. "Magneto-optic trapping of lithium using semiconductor lasers", Optics Communications 158 (1998) 263-272, wherein an MOT for Li atoms operated exclusively with low-power single-mode diode lasers is described, and J. L. Bliss, et al (Jet Propulsion Laboratory, Pasadena, Calif.), wherein an MOT based on a pyramidal trap geometry is described. For that matter, literally any device adapted to produce the desired atomic cloud 388 within the chamber 304 may be used.

Additionally, it will be noted that other geometries relating to the probe and coupling laser propagation within the cloud may be utilized. For example, a right-angle relationship between the two beams may be used. Alternatively, multiple coupling beams at one or more angles of incidence to the probe laser beam may be used, or conversely, multiple probe beams at one more angles of incidence to the coupling beam may be employed.

Figure 5A:
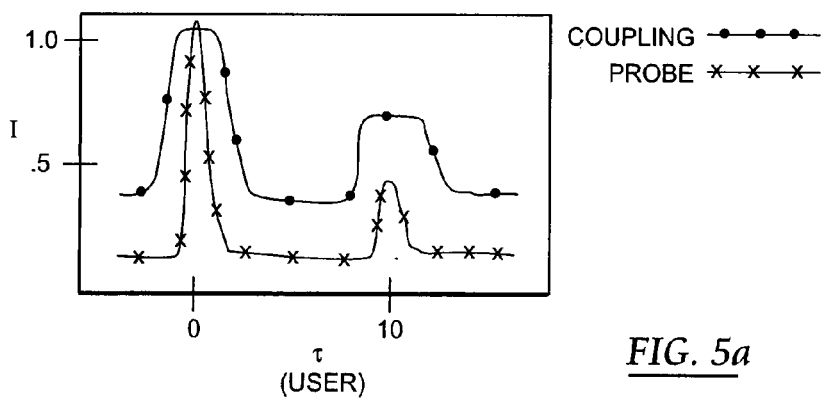
FIGS. 5a-5d are timing diagrams illustrating the temporal relationships of various events within the MTACC device during operation.
Figure 5B:
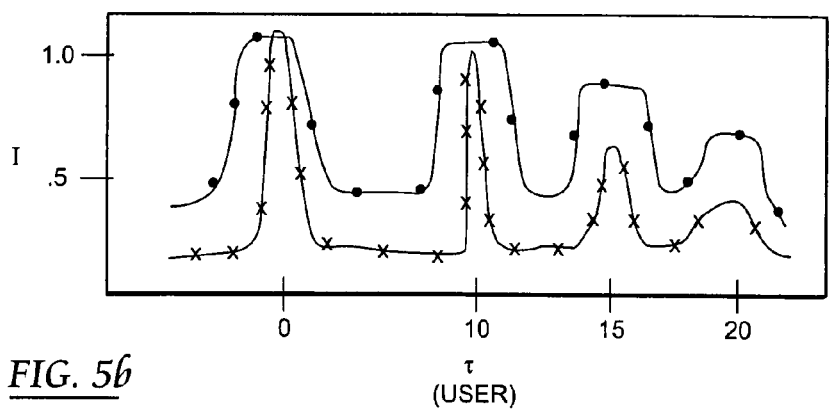
Figure 5C:
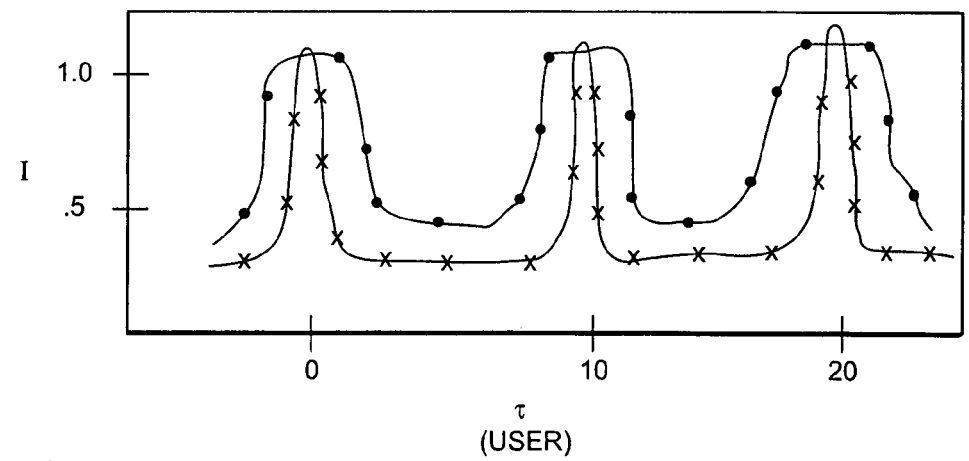
Figure 5D:
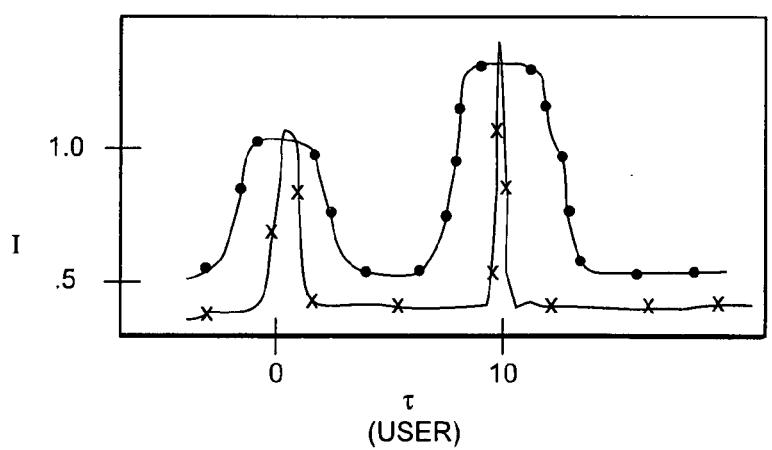

FIGS. 5a-5d illustrate the timing and amplitude relationships of the probe and coupling laser pulses according to the embodiment of FIG. 3. In FIG. 5a, a single pulse read-out at 10 microseconds is illustrated. The coupling filed intensity is reduced, thereby resulting in reduced "read out" probe pulse amplitude and somewhat greater temporal dispersion. In FIG. 5b, three pulses are sequentially read out of the cloud at 10, 15, and 20 microseconds, respectively. The coupling filed intensity is stepped down for each successive pulse, thereby causing a successive reduction in amplitude and temporal spreading of the pulses. FIG. 5c illustrates a sequential readout of two probe pulses at 10 and 20 microseconds, respectively, with constant coupling field intensity. Hence, read out pulse amplitude is consistent with that of the original probe pulse. In FIG. 5d, the coupling field intensity is increased for a single read-out occurring at t=10 microseconds. The resulting read-out pulse has amplitude greater than the original pulse, and comparatively reduced temporal dispersion.

It is further noted that the decay profile of the pulse stored within the atomic medium is consistent with an exponential decay (1/e). A decay time of 0.9 ms has been observed by Liu, which can be related to the calculated mean free time between elastic collisions in the atomic cloud having a density on the order of 10 micron-3.

Figure 6:
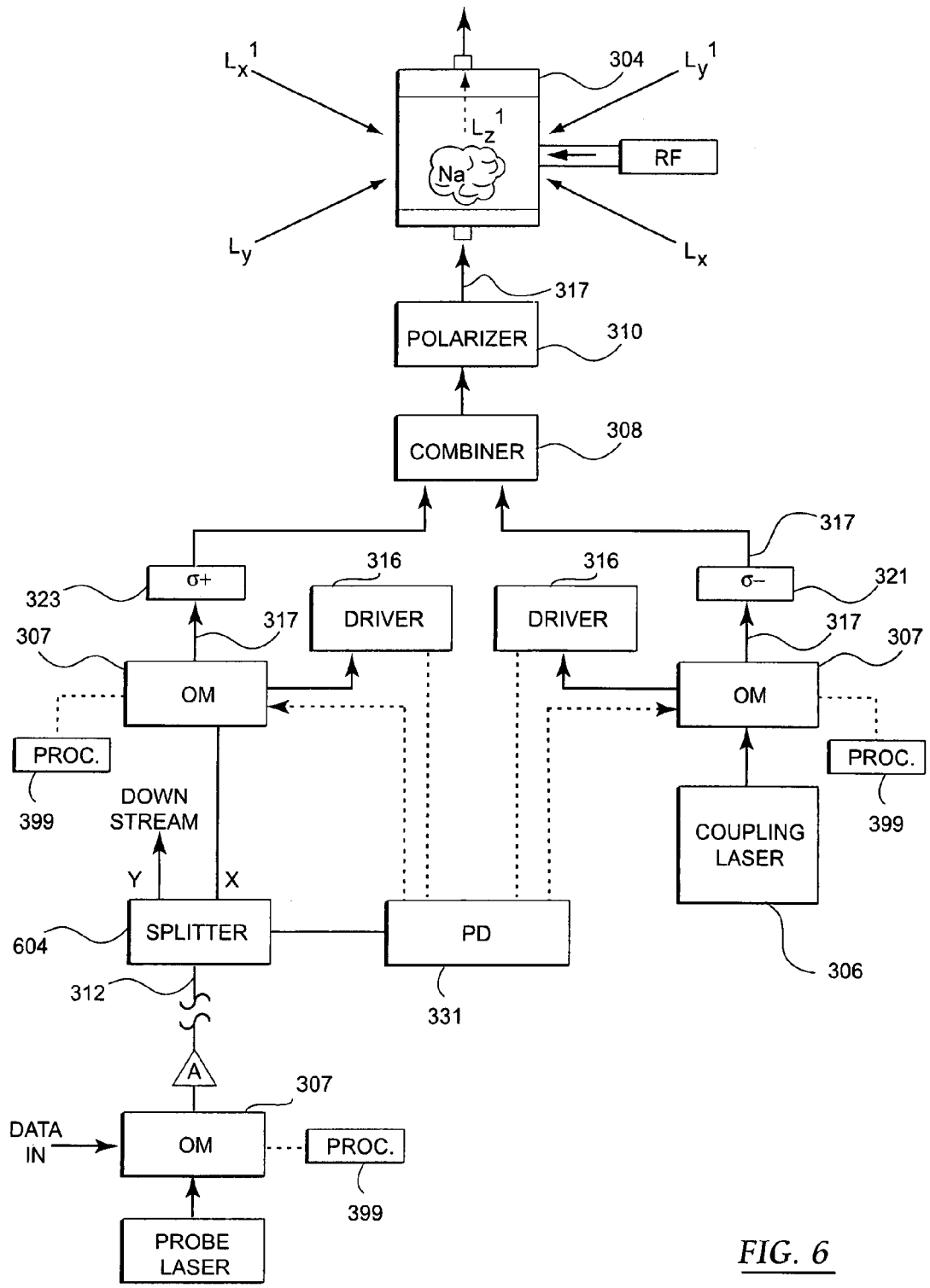
FIG. 6 is a functional block diagram of a second embodiment of the delay device of the invention incorporating a splitter from a fiber transmission line.

Note that as illustrated in the embodiment of FIG. 6, the probe laser pulse(s) may alternatively be split off the main transmission fiber 312 using, for example, an X/Y splitter 604 of the type well known in the art, where X and Y represent the fractions of the total transmitted energy split off and remaining in the original fiber after the splitter, respectively. In this fashion, the probe laser signal is parasitic on the main transmission fiber 312. The delayed signal (i.e., after exit from the chamber and subsequent depolarization and splitting) may subsequently be reintegrated with the main fiber using, for example, an optical combiner such as that described previously herein.

It will be readily apparent that the MTACC device described above has immediate utility for a variety of practical applications in optical communication and networking. For example, a pulse (train) delay function for a mode-locked WDM laser may be created using the MTACC. A plethora of other possible applications are possible, which may be readily performed by those of ordinary skill in possession of the present disclosure.

It is further noted that the temporal delay invoked by the MTACC may advantageously be adjusted to vary the resultant delay on the pulse (train). In one exemplary embodiment, the temporal delay induced by the MTACC device is controllable based on the selected shut-off period of the coupling laser 306 as determined by the optical modulator 307 and associated driver 316, up to values on the order of 1 ms. During such time, the quantum information present in the "frozen" pulse(s) remains essentially intact, thereby allowing subsequent readout as previously described with respect to FIG. 5.

In another exemplary embodiment, the delay is varied by changing the propagation speed of the pulse(s) through the atomic cloud 388 to the degree required to produce the desired temporal delay. The propagation speed is variable based on, inter alia, the laser cooling/temperature and RF evaporation of the atom cloud in the chamber 304. As previously discussed, evaporation is readily controlled by the application of RF (millimeter wave) energy to the cloud 388 via the RF source 363 and waveguide 365.

Figure 7A:
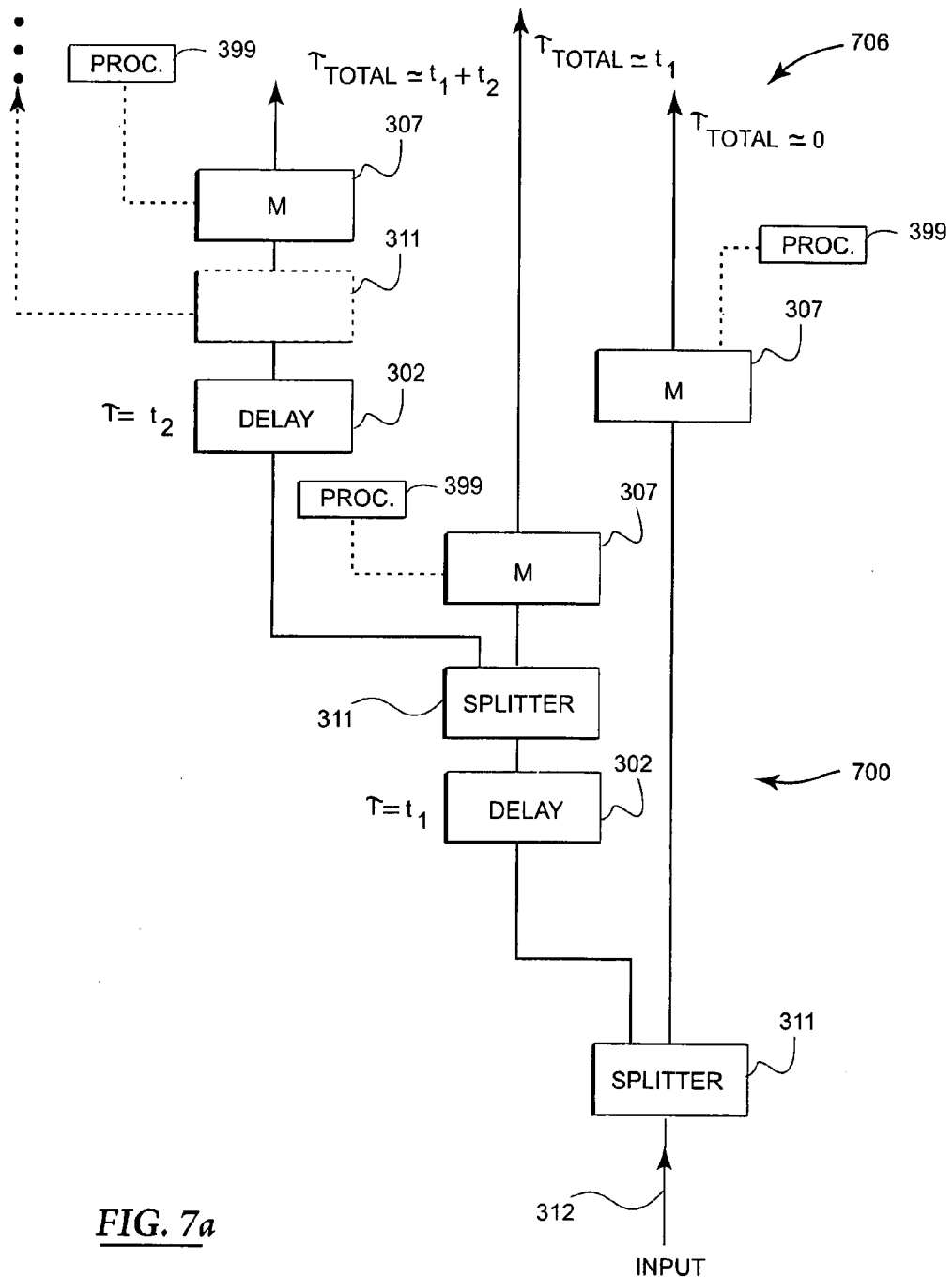
FIG. 7a is a functional block diagram of one exemplary embodiment of a delay network incorporating a plurality of MTACC devices.

In another embodiment (FIG. 7a), a variable delay line is provided wherein the delay is variable over a broader temporal range by using a multistage delay network 700. The network 700 comprises a plurality of MTACC delay chamber elements 302 arranged in a cascade configuration, which are each capable of producing variable delays up to 1 ms. Optical splitters 311 are used to selectively route the desired number of pulses to the appropriate chamber element 302, wherein the desired delay is applied according to the methods previously described herein. For a given node 706, the total delay D comprises the sum of the individual (variable) path delays in the path for that node, with the total delay being:

$$D_t = (N \times \tau) + d_p \quad \text{(Eqn. 13)}$$

Figure 7B:
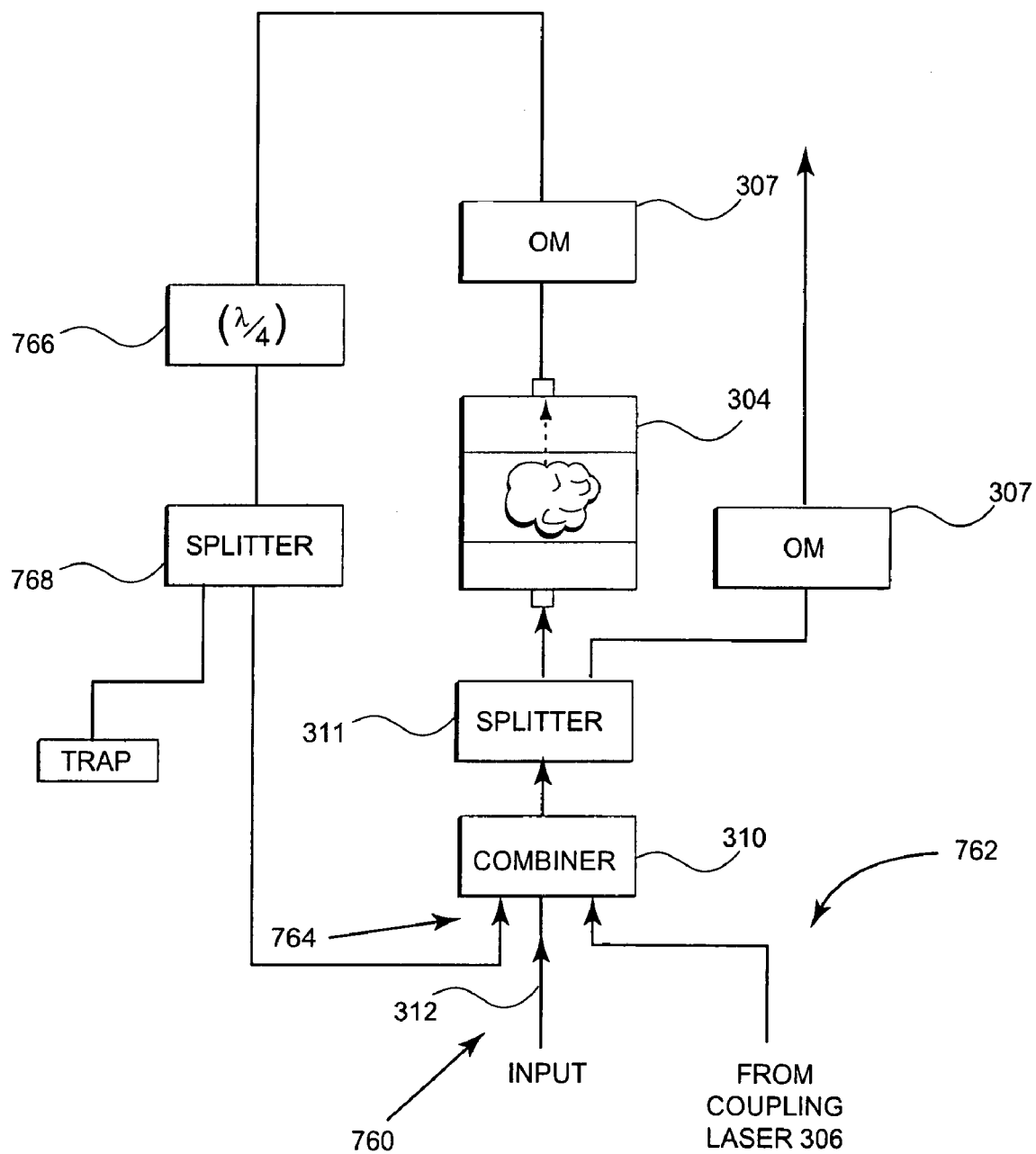
FIG. 7b is a functional block diagram of a second embodiment of a delay network incorporating the MTACC device of the invention, wherein the network comprises a loop-back arrangement and single MTACC device.

Where:
$D_t$=total delay for a given node $\tau$=delay provided by any single chamber element 302
N=the number of cascaded chamber elements in the network. Which are also in the path for that node
$d_p$=path length delay The path lengths associated with the individual nodes are optionally equilibrated such that no delay due to different path length is imposed (i.e., $d_p$ is equal for all nodes). Alternatively, the total path lengths are adjusted using, for example, conventional wound fiber core delay lines of the type well known in the art, to impart desired fractional delays. In one configuration, the network and delay chambers 302 are physically integrated into a unitary device 750 (shown as FIG. 7b), wherein a loop arrangement 752 is provided such that a single delay chamber 304 generates a discrete number of delay periods (which may be the same duration $\tau$ based on the coupling field generated by the coupling laser 306. The probe (data input) 760 and coupling 762 inputs are each combined via an optical combiner 310 and then subsequently split into two (2) signals, one proceeding into the delay chamber 304, and the other to an optical modulator 307. The desired delay $\tau_1$ is applied to the data pulse by selectively collapsing the co-propagating coupling laser field; the pulse is then read out of the chamber 304 by re-establishing the coupling field, wherein the ejected pulse(s) are then polarized using a quarter wave polarizier 766 and split via a splitter 768 (based on orthogonal polarization) to trap the coupling laser energy. The regenerated data pulse 764 is then fed back into the combiner 310 to be (selectively) delayed again for a second period $\tau_2$. Hence, the total delay imparted (aside from path length delays $d_p$) is given by Eqn. 14:

$$D_t = \Sigma \tau_1 + \tau_2 + \tau_3 \ldots \tau_n \quad \text{(Eqn. 14)}$$

In the present embodiment, the desired total time delay is input to an algorithm running on a high speed digital (e.g., RISC) processor 399, the algorithm and processor being adapted to perform the iterative time delay network calculations and generate (i) the variable time delays $\tau_n$; and (ii) number of iterations (n) required, based on known path length delays $d_p$. The instruction set of the processor is specifically adapted to efficiently perform the iterative processing computations associated with the delay algorithm. Control of the optical modulators 307 controlling the variable delay of each chamber delay iteration is accomplished using a microcontroller coupled to the aforementioned RISC processor, as is well known in the electronic arts. Note that due to switching, instruction cycle, interconnection, and other times associated with the operation of the algorithm on the RISC processor (and microcontroller), a minimum delay period $\tau_m$ is established. This results from the aforementioned processing components being unable to calculate and effect the desired delay in the apparatus fast enough to fall within the delay period. Accordingly, where extremely fast response (i.e., low delay times) are required, the optical triggering apparatus of FIG. 3, or alternatively, "fast" electronic devices specifically adapted for high-speed operation (such as that used in nuclear event counting and scaling instrumentation) may be substituted.

In yet another embodiment, the "repeated readout" behavior of the type demonstrated by Liu may be used to generate multiple delays of various duration for a finite number of iterations. As shown in Liu previously cited herein, several successive readouts of a "memorized" pulse by applying multiple, short coupling laser pulses to the cloud 388. Hence, it will be recognized that the first "read out" pulse, or the first and second, and so forth, may be read out at desired intervals. As a simple example, consider the case where the "memory" of the cloud is read out three times in succession, based on three coupling laser pulses at $t_1$, $t_2$, and $t_3$, respectively, thereby producing delay times corresponding to those values. Additionally, if the desired delay is $t_3$ only, only the third read-out is retained, and subsequently processed.

The aforementioned repeated readout functionality of the atomic cloud may also readily be adapted to generating multiple copies of a given pulse stored in quantum memory, as is described in greater detail below.

MTACC-Based Buffer

Figure 8:
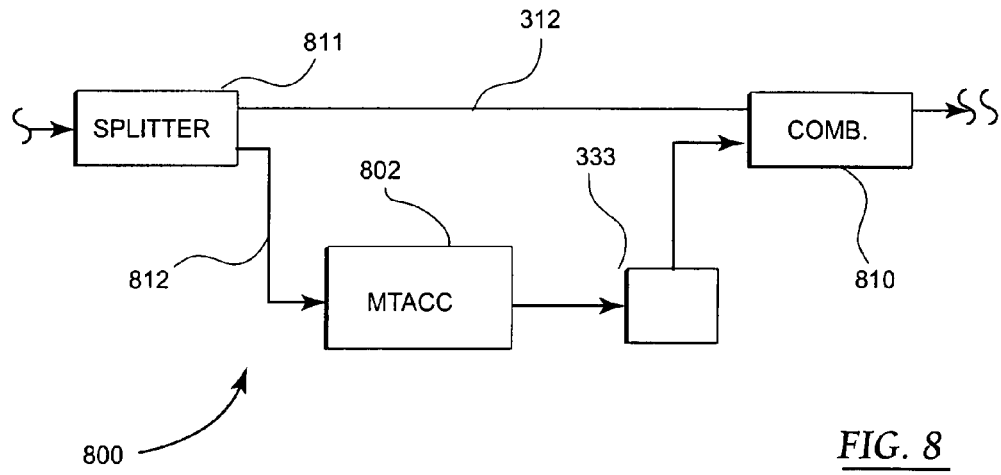
FIG. 8 is a functional block diagram illustrating a first exemplary embodiment of the memory buffer of the present invention, incorporating the MTACC delay apparatus of FIG. 3.

Referring now to FIG. 8, an improved apparatus and method for storing and retrieving an optical pulse (or pulse train) within an optical transmission system is disclosed. As will be readily appreciated by those of ordinary skill, such stored pulse(s) may be used for a variety of functions within the transmission including, without limitation, error detection and correction (EDC), and lost or degenerated pulse regeneration. Note that as used herein, the term "degenerated" refers to the condition wherein one or more parameters related to the pulse(s) has degraded, and in no way refers to "degenerate" boson behavior as previously described herein.

As shown in FIG. 8, the apparatus 800 comprises generally an optical "FIFO buffer" having an MTACC device 802 of the type previously described which has been adapted to store a plurality of light pulses transmitted across an optical communication fiber 812. The pulse (or pulses) are split off of the main transmission fiber 312 via an optical splitter 811 and periodically stored within the atomic medium 388 of the MTACC 802 using a coupling laser beam as previously described, the storage again accomplished through collapse of the coupling field after entry of the (resonance) pulse split off the main fiber 312. The pulse (train) is spatially compressed (due to reduced group velocity $V_g$) and "frozen" within the chamber for a predetermined period of time, and then shifted out of the MTACC 802 and selectively discarded or alternatively reintegrated with the transmission path 312 using an optical combiner 810 (after polarization into orthogonal coupling and "probe" components using the quarter wavelength polarizer 333). The decision to discard or reintegrate is based on any number of possible criteria, including for example a signal received from an upstream or downstream node in the optical network, such as from EDC testing performed at the next downstream receiver or repeater (not shown). Alternatively, "dropped" or lost pulse data may be rapidly regenerated and transmitted to the receiver/repeater, especially where the buffers of the invention are disposed more proximate to the receiver/repeater than the source node. For example, on a 100 km source-to-receiver transmission path, a buffer 800 placed at the 50 km point in the path would allow regeneration of pulses with substantially reduced lag time compared to regeneration at the source (approximately a factor of 2 difference). Similarly, a buffer 800 placed immediately before a repeater would permit almost instantaneous pulse regeneration upon EDC analysis performed by the repeater.

The buffer apparatus 800 of the FIG. 8 is operated in a "first-in, first out" (FIFO) sequence, wherein incoming pulses or pulse trains are shifted into the MTACC 802, subsequently shifted (read) out, new incoming pulses read in thereafter, and so forth, the time between read-in and read-out being determined by the desired delay (up to the storage limit of the chamber, before significant degradation of the stored pulses occurs). The buffer 800 may operate in (i) "batch" mode, wherein a grouping of pulses is read into the chamber (up to its limit of compressed pulse storage) and read out, or (ii) "mono-pulse" mode, wherein each individual pulse is read in and out sequentially.

Batch mode operation results in the storage of n pulses in the MTACC chamber, the coupling field is collapsed after all n of the pulses are contained within the atomic cloud 388 of the chamber. Accordingly, it will be recognized that spatially non-symmetric cloud geometry may be utilized to effectuate greater storage capacity within the device 800. For example, a substantially elongated chamber having essentially cylindrical cloud geometry, with the axis of the cylinder disposed along the propagation path of the coupled laser beams, will allow storage of a proportionately greater number of pulses.

Mono-pulse mode comprises simply storing and reading out each pulse in succession through rapidly pulsed or modulated application of the coupling laser field.

Figure 9:
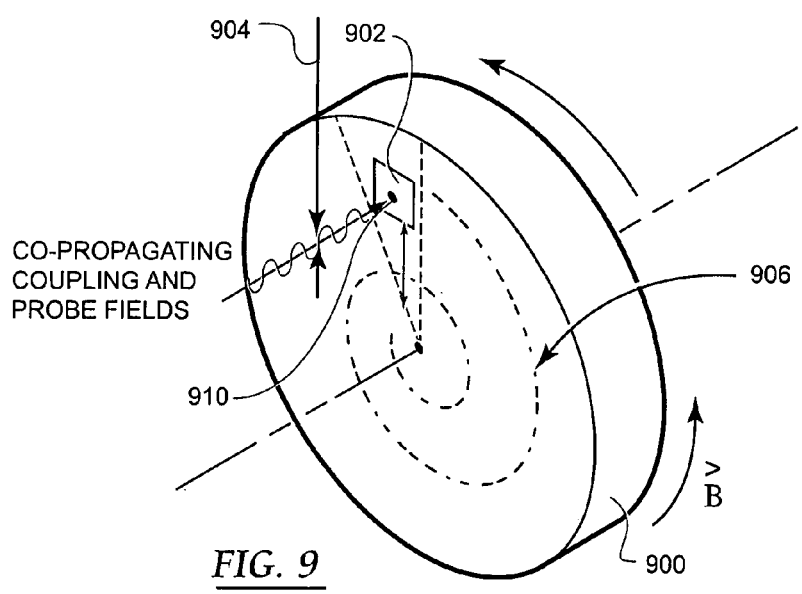
FIG. 9 is a perspective view of a rotating magnetic driven atomic cloud storage arrangement used for multiple pulse storage, according to the invention.

Other physical configurations may be exploited, such as a "moving" cloud which is capable of storing multiple pulses in different sections of the cloud. For example, consider the disk-shaped cloud 900 wherein light pulses are injected into the cloud in a direction normal to the planar surfaces of the disk, as shown in FIG. 9. The cloud "disk" 900 is rotated, such as via rotating magnetic field or otherwise, such that a previously unexploited solid angle 902 corresponding to the probe/coupling beam diameter 904 is exposed coincident with the leading edge of the probe pulse to be stored arriving at the forward cloud edge 906. With proper synchronization, the rotating cloud 900 acts like a "rotary magazine", storing pulses at different angular displacements or sectors within the cloud. Similarly, the relationship between the ingress point 910 of the laser beams and the cloud is radially altered such that a "spiral" storage pattern is generated. Clearly, many different variations on the theme of multiple pulse storage may be effected consistent with the invention.

Additionally, modulation schemes on the transmission (and reception) ends of the system may be modified to accommodate the chosen buffering scheme at the buffer 800. For example, where "batch" mode is selected, the optical modulator on the transmission end of the fiber may be controlled so as to "bunch" a grouping of pulses together spatially/temporally, the number in the grouping not to exceed the single-cycle storage capacity of the downstream buffer. Hence, the transmission of pulse groupings may be synchronized (accounting for propagation delays and leading/trailing pulse dispersion) such that the arrival of a given pulse grouping coincides with the read-out from the buffer of the prior grouping.

Alternatively, the modulation frequency (corresponding to the inter-pulse pulse period) may be selected so as to correspond with the maximal read-in frequency of the buffer, thereby not "over-running" the buffer resulting in lost pulses. In this fashion, every pulse transmitted by the source laser/modulator (or at least a fraction thereof, dependent if a splitter is employed) may be stored within the buffer 800 and subsequently read out. Hence, complete (i.e., 100%) recoverability may be traded for bandwidth.

As yet another alternative, multiplexed buffering arrangements may be used to accommodate higher bandwidths. For example, two or more buffers multiplexed with respect to incoming pulses (or pulse groupings) may be used to increase the effective buffer bandwidth, thereby allowing a corresponding increase in system bandwidth while still maintaining complete recoverability. Such multiplexing may be accomplished using, for example, an optical splitter and coordinated modulation of the split optical signals and associated coupling laser fields, or any number of other techniques.

It will be further recognized that incomplete or partial storage of pulses or pulse groupings may be employed consistent with the invention, to further reduce any restriction on system bandwidth. Such incomplete or partial storage may be functionally linked to any number of deterministic criteria, including expiration of a predetermined or dynamically variant interval, triggering based on an observed pulse timing or frequency pattern (e.g., a pattern corresponding to transmission of a certain state "flag" or marker), statistically-based triggers, etc. For example, pulse group storage may be invoked based on moving-window statistics transmitted back to the buffer indicating that the occurrence of lost or degenerated pulses at a downstream repeater is above a predetermined threshold level. A plethora of other criteria (and combinations thereof) are possible.

Alternatively, pulses of selected wavelength in a WDM-based system may be selectively stored in the buffer. As is well known, wavelength division multiplexed systems generally utilizes a plurality of lasers each operating at a different wavelength. Each laser is modulated with independent data with an NRZ signal of a given bit rate, and their outputs combined as a "train" of pulses in a single optical fiber. The train of pulses may further be passed through a Mach-Zehender modulator driven, for example, with a sine wave synchronized with the bit rate of the NRZ drive to the lasers. Alternatively, an electro-optic modulator adapted for high gigabit-range modulation may be used, such as the Lucent EO previously described with respect to FIG. 3.

Furthermore, multiple readouts of pulse(s) stored in the buffer are possible as previously described herein, thereby allowing for multiple error corrections. For example, a single pulse stored within a buffer and read out in response to a received EDC signal may be read out once and transmitted; the same pulse may be held in the buffer for its remaining useable lifetime in the cloud (i.e., before quantum state degradation occurs) for a subsequent second or even third readout if need be.

Repeater

Figure 10A:
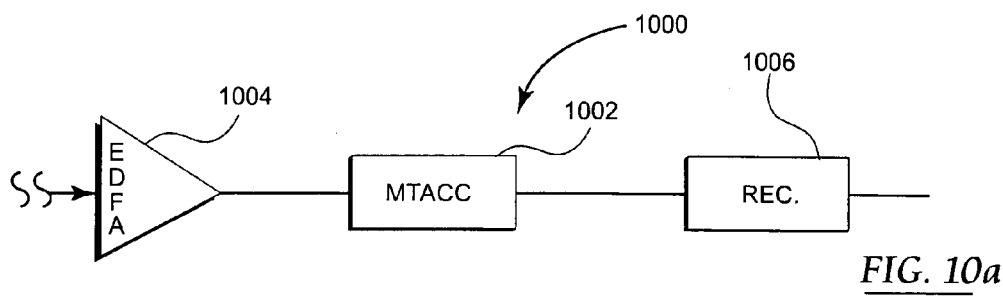
FIG. 10a is a functional block diagram illustrating an exemplary embodiment of a communications network including the optical repeater device of the present invention.
Figure 10B:
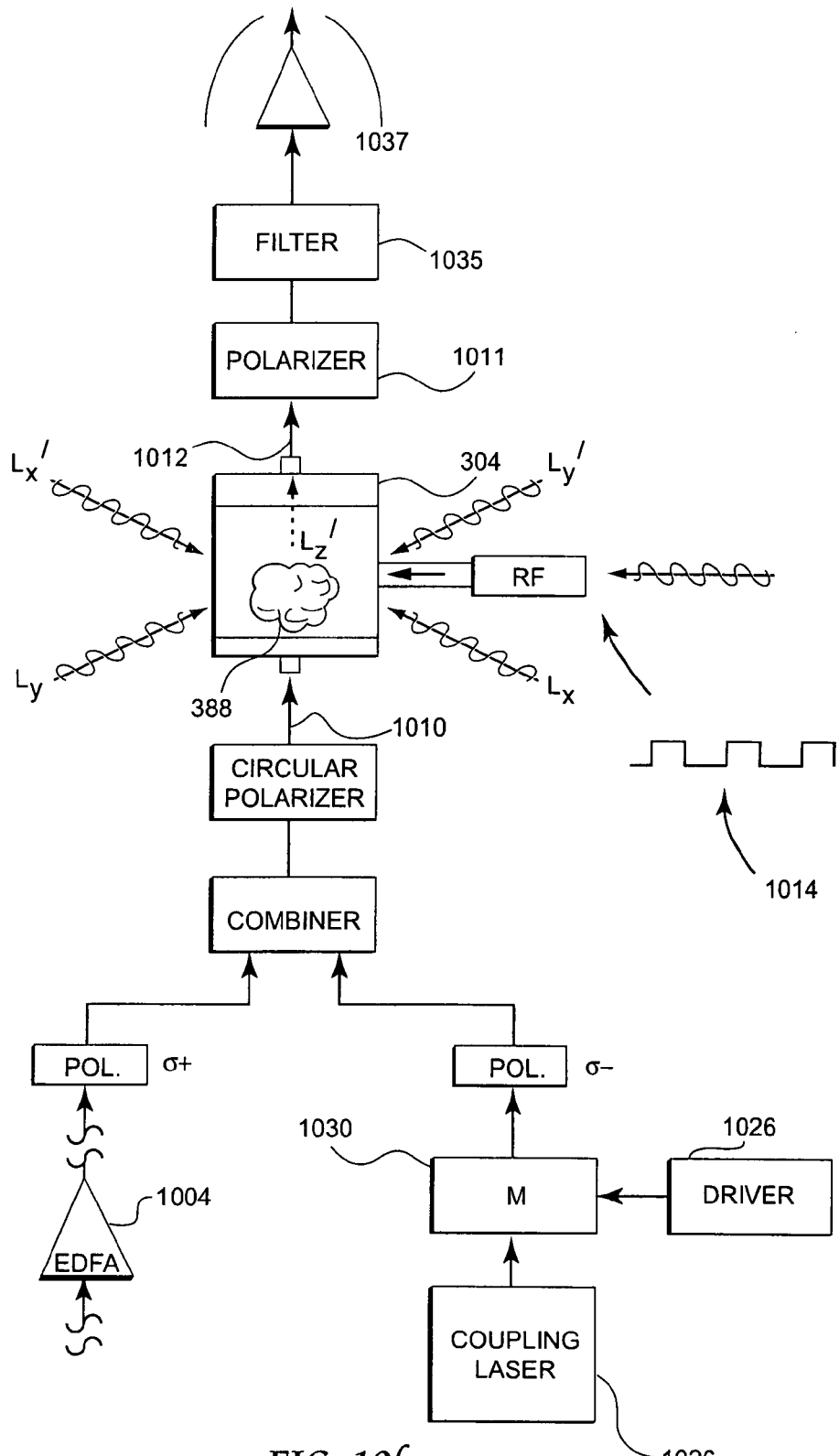
Figure 10C:
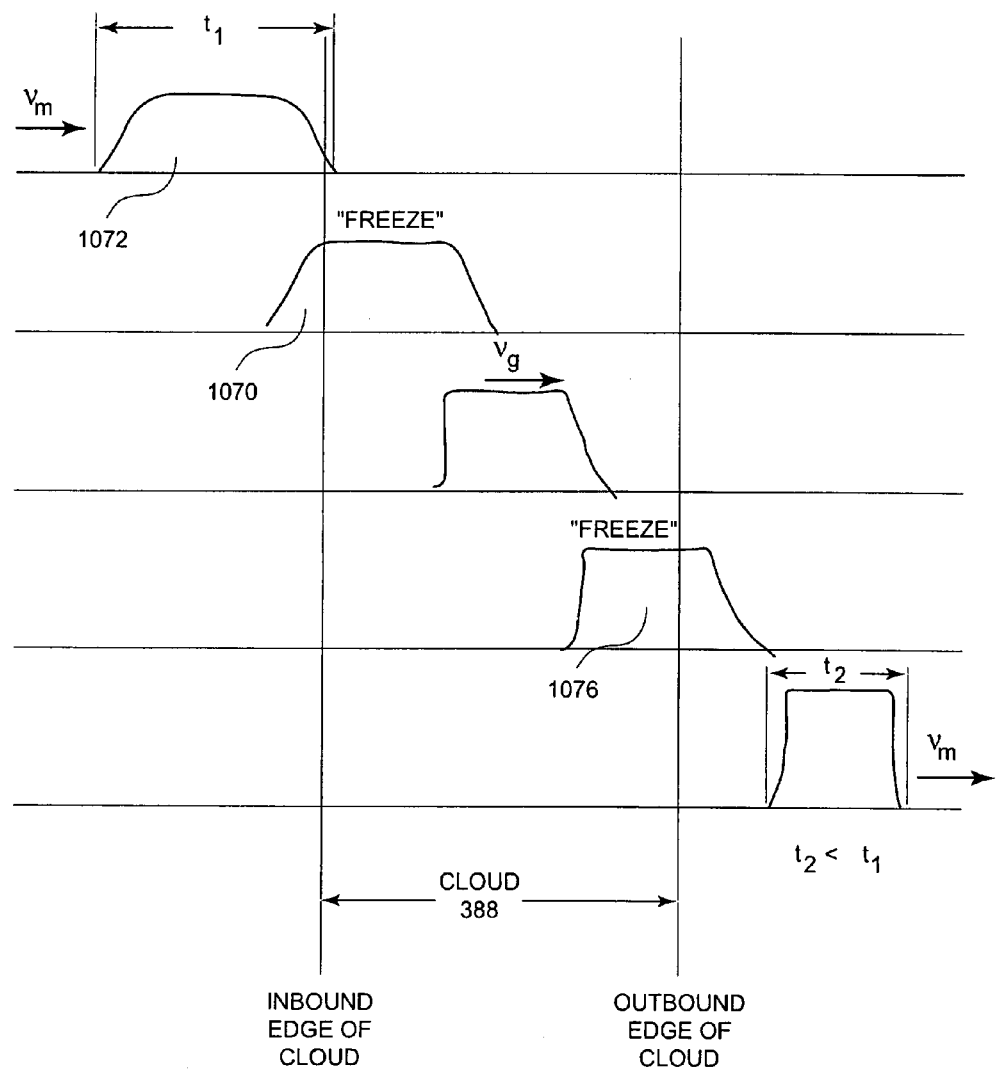
FIG. 10c is a graphical representation of an exemplary pulse propagation scheme according to the present invention.

Referring now to FIGS. 10a-10c, an optical repeater according to the invention is described.

In long fiber transmission lines, the amplification function is often performed by amplifiers such as Erbium Doped Fiber Amplifiers (EDFAs) of the type well known in the art. The amplifier is able to compensate for power loss due to signal absorption in the optical fiber, but it is generally unable to correct the signal distortion caused by related to any number of attendant factors including "chirping", linear dispersion, wave mixing, polarization distortion and other propagation-related or timing effects. Additionally, noise accumulated along the transmission line is not addressed by such EDFAs or other amplifiers.

WDM networks typically use modulated lasers as the source of laser light, as previously described. However, the pulses produced by such lasers in the WDM context are often characterized by chromatic dispersion of the pulses. Specifically, the leading and trailing edges of the pulse(s) typically includes multiple frequency components that are changing from one state to another (e.g., "low" to "high"). When transmitted over an optical fiber, such pulses experience a phenomenon commonly referred to as "chirping", which ultimately reduces the distance a train of closely spaced pulses can be transmitted without overlap between individual pulses in the train. Obviously, such overlap detracts from the signal quality, and the ability to recover the signal information at the receiver end of the transmission line.

One approach to improving the quality of pulses from a directly modulated laser comprises passing the pulses through a narrowband filter to remove unwanted transitional frequency components at the leading and trailing edges of the pulses.

Another approach used in soliton systems comprises a non-return-to-zero (NRZ) electro-absorption optical modulator with a soliton pulse shaper, which attenuates the regions of highest transient chromatic dispersion generated by the NRZ modulator.

In spite of the foregoing filtering/shaping techniques, the optical signal must periodically be regenerated, especially after a cascade of multiple amplifiers (such as would be encountered over a long distance transmission path). Many factors including those relating to the initial laser source, input signal, transmission fiber, and amplifiers contribute to the determination of the distance at which regeneration must occur. Typically, regeneration of the signal is performed with electronic repeaters operating on the principle of optical-to-electronic conversion. However, there are significant drawbacks associated with such conversion, including increased cost, and generally complex and often error-prone supporting/compensating electronics. Ideally, the repeating process remains entirely in the optical domain, as in the present invention.

In the embodiment of FIGS. 10a-d, the repeater 1000 comprises a magnetically trapped atomic cloud chamber (MTACC) 1002 of the type previously described herein which is interposed between an EDFA 1004 and a receiver 1006 along a fiber transmission cable 1008. It will be recognized that while the embodiment of FIG. 10a shows an EDFA-MTACC-receiver configuration, numerous other configurations requiring signal repeating may be used consistent with the invention. For example, the repeater could be interposed between the source laser (with modulator) and the first EDFA, between two EDFAs, etc.

As shown in FIG. 11b, the repeater 1000 comprises the MTACC 1002 having the upstream fiber segment 1010 as the input, and the downstream segment 1012 as the output. The inherent optical pulse compression feature of the atomic cloud 388 of the MTACC as described with respect to FIGS. 3-5 herein advantageously compresses the temporally dispersed light pulses in the train 1014 arriving at the repeater 1000 from the EDFA 1004. The pulses are compressed and "frozen" within the cloud chamber (in spatially compressed form) for a given duration by modulating the optical modulator 1030 of the coupling laser source 1026, and then subsequently read out of the MTACC 1002 by reinitiating coupling laser energy flow with the input pulse train 1014. The "read out" pulse is then shaped using any number of techniques. In the embodiment of FIG. 10b, the pulse is polarized into orthogonal components corresponding to the probe (data) and coupling pulses via a polarizer 1011, the data pulse being subsequently filtered using a narrowband wavelength filter 1035 which effectively eliminates unwanted frequency components on the leading and trailing edges of the pulse after read-out. The pulse is then amplified by an EDFA 1037, and transmitted downstream to the receiver or next repeater.

In another embodiment, the outgoing data pulse is "chopped" using a high-speed optical modulator (not shown) of the type previously described herein, which shapes the pulse by truncating the leading and trailing edges thereof according to a windowing function applied to the electrical input of the modulator. Such windowing functions are well known in the electronic arts, and accordingly not described further herein. Other pulse shaping techniques may also be employed consistent with the invention.

In another embodiment, the probe pulse is shaped through a sequential "stutter" propagation through the MTACC chamber, as illustrated in FIG. 10c. Specifically, the trailing edge 1070 of the chromatically and/or spatially dispersed probe pulse 1072 is truncated by collapsing the coupling laser field before the entire pulse 1072 has entered the atomic cloud. In this fashion, the light energy associated with the trailing edge portion of the pulse is dispersed into the chamber through evaporation of a minute fraction of the condensate, with the leading portions of the pulse being "frozen" in the cloud 388. Similarly, as shown in FIG. 10c, the leading edge 1076 of the pulse 1072 is truncated by allowing the incoming pulse to advance spatially to the point where the leading edge has exited the atomic cloud 388. At this point in time, the coupling laser field is collapsed, and the portion of the pulse residing within the cloud "frozen". Again, the un-captured energy is dissipated within the chamber. In order to truncate both the trailing and leading edges, the pulse is "stuttered" through the chamber as follows: (i) the pulse is inserted into the cloud up to the desired point of truncation, and then the coupling field collapsed to freeze the pulse. After a short delay (typically a few a few nanoseconds) to allow the dissipation of the trailing edge energy, the coupling field is re-established for a short duration as required to allow the pulse to propagate (at Vg) until the leading edge has exited the cloud 388. At this point, the coupling field is again collapsed, thereby freezing the doubly-truncated pulse in the cloud for a period up to the remaining useful lifetime of the pulse (i.e., before significant quantum degradation sets in), where upon the truncated pulse is completely read out of the cloud.

It will be noted that the foregoing arrangement 1000 affords the distinct benefit of avoiding the process of optical pulse sensing or recognition, conversion from the optical to the electrical domain, and then regeneration of a new optical pulse based on an electrical signal. Rather, the present invention "freezes" a compressed form of the original optical pulse, and then applies pulse shaping and amplification after "un-freezing."

As yet another embodiment, the temporal width of the probe pulse ejected from the MTACC chamber is controlled by varying the intensity of the coupling laser field upon reestablishment thereof. Specifically, the coupling laser pulse field intensity $I_c$ is increased over the baseline intensity $I_0$ used to couple or read-in the probe pulse initially. As demonstrated by Liu, such increase in intensity (i.e., ratio of Ic/Io) allows the extracted pulse to have greater amplitude and shorter temporal span. Hence, this approach is a particularly attractive method of shaping repeated or regenerated pulses, since it is directly controlled by the intensity of the coupling field applied during readout.

It will further be recognized that this technique may be used in conjunction with other aspects of the invention, such as (for example) the aforementioned "FIFO" buffer. Specifically, pulse(s) stored in the buffer may be read out using the increased intensity coupling field, which effectively compresses the pulses temporally before/upon ejection. Hence, the buffer can be used as a fully optical "booster" and pulse shape regenerator of sorts, in that incoming pulses suffering significant degradation due to chromatic dispersion and losses in the fiber can be boosted in amplitude and reduced in temporal dispersion through storing the pulses in the MTACC using a first intensity coupling field and subsequently re-establishing the coupling field at a higher intensity during the usable lifetime of the pulse(s) in the cloud.

In yet another embodiment, the spatially compressed form of the optical pulse stored in the atomic cloud 388 is exploited in order to derive the "compressed" quantum information from the pulse. This methodology is illustrated in FIG. 11. As previously discussed, the pulse is compressed based on reduced group velocity Vg through the atomic cloud. Hence, while the pulse is contained within the cloud, the spatial compression ratio for the pulse as a whole, relative to propagation in medium m, is defined by Eqn 15:

$$CR = V_g/V_m \qquad \text{(Eqn. 15)}$$

Where:
CR=spatial compression ratio
$V_g$=group velocity in cloud
$V_m$=group velocity in medium m Such compression affords the opportunity to copy the frozen pulse while in a compressed state, thereby replicating the quantum state information, yet in an "unfrozen" state such that no decompression of the replicated pulse occurs during subsequent amplification/transmission. No electro-optic interface is required, since coherent light is used as the interrogating medium for extracting the quantum information from the frozen pulse.

Very low energy remains in the compressed probe (data) pulse; it is effectively depleted prior to any significant changes in the atomic population amplitudes. This process is reversed when the coupling laser field is re-established, since the probe pulse regenerates via stimulated emission into the probe laser field. During the time when the probe pulse is frozen in the atomic cloud 388, information about the amplitude of the probe pulse field is stored in the form of atomic population amplitude information, the latter defining the atomic states, and probe pulse mode vector information is similarly contained in the phase relationship existing between different atoms in the cloud 388. By reducing the temperature of the cloud such that thermally-induced motion of the atomic population is mitigated, "smearing" of the phase information during the storage time is minimized also. Liu, id. The difference between the wave vectors of the probe and coupling laser fields determines the wavelength of the phase pattern stored in the atomic cloud. This wavelength is many times larger than the wavelength of the coupling or probe laser fields. Furthermore, the atomic coherence stored in the cloud is determinative of the ratio of the Rabi frequencies of the coupling and regenerated probe fields.

Hence, it will be recognized that a laser beam adapted to generate certain ratios of Rabi frequencies can be used as an indicator of the stored atomic coherence within the cloud. Specifically, by inserting the interrogation field (via interrogation laser pulses) into the atomic cloud locality where the probe (data) pulse is stored, the interrogation field bearing a known Rabi frequency relationship to the stored probe field, the stored atomic coherence can be "backed out". Hence, an interrogation field having a selected Rabi frequency $\Omega_i$ can be used to divine the stored atomic coherence by identifying superposition states existing within the cloud according to Eqn. 11 above. For example, in one embodiment, the interrogation field comprises a pulsed coherent laser field whose Rabi frequency is selectively "tunable" via the field amplitude vector $E_i$.

Furthermore, control of the wave vectors for the probe and interrogation pulse fields may be used to control the wavelength of the imprinted or stored probe pulse. Specifically, the establishing a predetermined ratio of the magnitude of the two wave vectors, an imprint of known wavelength may be induced into the atomic medium. This technique has obvious applicability in the control of chromatic content in the regenerated pulse; a purposeful change in the coupling laser field will regenerate a pulse with a new wavelength. Recall that since even the most coherent of laser sources has some chromatic "spread" in its output, chromatic dispersion of the pulses derived from that output occurs due to the differing velocities of those chromatic components in the transmission medium (e.g., fiber). Hence, a pulse is spectrally "stretched" when it arrives at a distant node. Accordingly, the present invention may be used to "blue shift" a received pulse by storing the pulse in the MTACC and subsequently altering the ratio of wave vectors for the probe and coupling fields so as to produce a regenerated pulse having its spectral distribution shifted upward somewhat in term of frequency (shorter wavelength).

Millimeter Wave Transmission System

Referring now to FIG. 12, an improved apparatus and method for transmitting millimeter waves across an optical transmission system with a delay is disclosed. As shown in the embodiment of FIG. 12, the apparatus 1200 comprises a millimeter wave source 1202, RF driven optical modulator 1204, laser energy source 1206, modulator driver 1208 optical fiber 1212, and MTACC device 1214 as previously described herein. The millimeter wave signal to be transmitted varies in intensity; this variation modulates the output of a "probe" laser source 1206 via the optical modulator 1204. A Lithium Niobate optical modulator of the type previously described is used in the apparatus. The modulated light emanated from the probe laser is transmitted through the length of optical fiber 1212 (and any interposed repeating devices), and subsequently detected by a millimeter wave bandwidth photodiode 1220 disposed at the receiving (or repeating) location. The output of the photodiode 1220 is an electrical current proportional to the intensity of the received light pulses generated by the probe laser 1206. The diode output current is electrically is coupled to a receiver load 1222 and demodulated (using appropriate demodulation techniques well known in the art) to recover the original millimeter wave signal. Variable time delay is accomplished via the MTACC device, the delay imposed by the MTACC controlled via an optical modulator 1228 applied to the output of the associated coupling laser source 1230.

It will be recognized that while the foregoing embodiments of the invention are described in terms of unidirectional transmission, the apparatus may readily be adapted for multidirectional transmission, such as by using multiple MTACCs, one for each of the transmission paths, or alternatively using one chamber in a multiplexed scheme, or alternatively another access technique. For example, a single MTACC may be bi-directionally time-division multiplexed (TDM), frequency/wavelength division multiplexed (FDM/WDM), or otherwise.

It will further be recognized that with proper adaptation, light emitting diodes (LEDs) of the type well known in the semiconductor arts may be used as one or more of the light sources described herein in place of or in conjunction laser sources. LEDs have the advantage of much lower power requirements and no temperature regulation, thereby simplifying the resultant design; however, they are subject to increased chromatic dispersion which may be unacceptable, especially for high bandwidth systems where minimal pulse dispersion is critical.

It will be yet further recognized that the foregoing the methodologies and apparatus described herein may be readily applied to systems using either soliton pulses or more substantially dispersive pulses.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The described embodiments are to be considered in all respects only illustrative and not restrictive. The scope of the invention is, therefore, indicated by the appended claims rather than the foregoing description. All changes that come within the meaning and range of equivalence of the claims are to embraced within their scope.

What is claimed is:

1. A method of conditioning light energy in an optical communication system, comprising:
    providing first electromagnetic radiation having a plurality of information associated therewith;
    providing second electromagnetic radiation;
    providing an atomic medium;
    irradiating said atomic medium with said first electromagnetic radiation; and
    selectively irradiating said medium with said second radiation, said second radiation at least in part controlling the propagation of said first radiation through said medium;
    wherein said act of selectively irradiating comprises controlling the application of said second radiation to said atomic medium based on receiving input from said communication system; and
    wherein said method further comprises diverting at least a portion of said first radiation for propagation within said communication system apart from said atomic medium.

2. The method of claim 1, wherein said act of receiving input comprises receiving information relating to the dispersion of said at least portion of said first radiation.

3. A method of conditioning light energy in an optical data communication system, comprising:
    providing first electromagnetic radiation having information associated therewith;
    providing second electromagnetic radiation;
    providing an atomic medium;
    irradiating said atomic medium with said first electromagnetic radiation to store at least part of said information therein;
    selectively and subsequently irradiating said medium with said second radiation, said second radiation at least in part controlling the readout of said stored information from said medium; and
    diverting at least a portion of said first radiation for propagation within said communication system apart from said atomic medium;
    wherein said act of selectively irradiating comprises controlling the application of said second radiation to said atomic medium based on receiving input from said data communication system.

4. The method of claim 3, wherein said input from said communication system comprises indication of degradation or loss of all or a portion of said diverted at least portion of said first radiation.

5. The method of claim 3, wherein said input from said communication system comprises a delay line calculation to produce a desired delay of said stored information read out from said first radiation medium relative to said diverted at least portion of said first radiation.

6. For use in data network used to transfer a plurality of data bits from a first location to at least one a second location, said second location being distant from said first location within said network, a method of conditioning light energy comprising:
providing first electromagnetic radiation having information associated therewith;
providing second electromagnetic radiation;
providing an atomic medium;
irradiating said atomic medium with said first electromagnetic radiation to store at least part of said information therein;
selectively and subsequently irradiating said medium with said second radiation, said second radiation at least in part controlling the readout of said stored information from said medium, said selectively irradiating comprising controlling the application of said second radiation to said atomic medium based on dispersion analysis of at least a portion of said data network; and
diverting at least a portion of said first radiation for propagation within said network apart from said atomic medium.

7. The method of claim 6, wherein said dispersion analysis comprises accounting for the estimated dispersion of said at least portion of said first radiation.

8. The method of claim 6, wherein said dispersion analysis comprises accounting for the estimated dispersion of light energy pulses within said network.

9. The method of claim 6, wherein controlling the application of said second radiation is further based on an indication of degradation or loss of all or a portion of said diverted at least portion of said first radiation.

10. The method of claim 6, wherein said controlling the application of said second radiation is further based on a delay line calculation to produce a desired delay of said stored information read out from said first radiation medium relative to said diverted at least portion of said first radiation.

11. Apparatus comprising an optical medium and adapted to condition light energy in an optical data communication system, the apparatus comprising:
apparatus adapted to irradiate said optical medium with first electromagnetic radiation having information associated therewith to at least temporarily store at least part of said information in said medium;
apparatus adapted to selectively and subsequently irradiate said medium with second electromagnetic radiation to at least in part control the readout of said stored information from said medium; and
apparatus adapted to divert at least a portion of said first radiation for propagation within said communication system apart from said medium;
wherein said selectively irradiating comprises controlling the application of said second radiation to said medium based on receiving input from said data communication system.

12. The apparatus of claim 11, wherein said input from said communication system comprises indication of degradation or loss of all or a portion of said diverted at least portion of said first radiation.

13. The apparatus of claim 11, wherein said input from said communication system comprises a delay line calculation to produce a desired delay of said stored information read out from said first radiation relative to said diverted at least portion of said first radiation.

14. Apparatus comprising an atomic medium and adapted to condition light energy in an optical data communication system, the apparatus further comprising:
first apparatus adapted to receive first electromagnetic radiation having information associated therewith;
second apparatus adapted to receive second electromagnetic radiation;
third apparatus adapted to irradiate said atomic medium with said first electromagnetic radiation to store at least part of said information therein;
fourth apparatus adapted to selectively and subsequently irradiate said medium with said second radiation to at least in part control the readout of said stored information from said medium; and
fifth apparatus adapted to divert at least a portion of said first radiation for propagation within said communication system apart from said atomic medium;
wherein said selectively irradiating comprises controlling the application of said second radiation to said atomic medium based on receiving input from said data communication system.

15. The apparatus of claim 14, wherein said input from said communication system comprises indication of degradation or loss of all or a portion of said diverted at least portion of said first radiation.

16. The apparatus of claim 14, wherein said input from said communication system comprises a delay line calculation to produce a desired delay of said stored information read out from said first radiation relative to said diverted at least portion of said first radiation.

* * * * *